(12) United States Patent
Nelson

(10) Patent No.: US 6,262,736 B1
(45) Date of Patent: Jul. 17, 2001

(54) INTERACTIVE CONNECTION, VIEWING, AND MANEUVERING SYSTEM FOR COMPLEX DATA

(76) Inventor: Theodor Holm Nelson, 3020 Bridgeway #295, Sausalito, CA (US) 94965

(*) Notice: Subject to any disclaimer, the term of this patent is extended or adjusted under 35 U.S.C. 154(b) by 0 days.

(21) Appl. No.: 09/530,857

(22) PCT Filed: Nov. 15, 1998

(86) PCT No.: PCT/US98/24334

§ 371 Date: May 5, 2000

§ 102(e) Date: May 5, 2000

(87) PCT Pub. No.: WO99/26160

PCT Pub. Date: May 27, 1999

Related U.S. Application Data

(60) Provisional application No. 60/065,965, filed on Nov. 15, 1997.

(51) Int. Cl.[7] ............................................. G06F 9/70
(52) U.S. Cl. ............................................. 345/357; 345/355
(58) Field of Search .................. 345/357, 356, 345/340, 346, 342, 341, 339, 333, 334, 335, 336, 343, 347, 348, 349, 352, 353, 354, 355, 121, 131, 440, 429, 420, 433, 169

(56) References Cited

U.S. PATENT DOCUMENTS

| | | | |
|---|---|---|---|
| 5,499,330 * | 3/1996 | Lucas et al. ................ | 345/356 |
| 5,621,874 * | 4/1997 | Lucas et al. ................ | 345/356 |
| 5,627,980 * | 5/1997 | Schilit et al. ................ | 345/390 |
| 5,634,062 * | 5/1997 | Shimzu et al. ............... | 345/340 |
| 5,644,740 * | 7/1997 | Kiuchi ........................ | 345/340 |
| 5,680,619 * | 10/1997 | Lumundson et al. ......... | 395/7.1 |
| 5,701,137 * | 12/1997 | Kierman et al. ............. | 345/357 |
| 5,980,096 * | 11/1999 | Thalhamner-Reyero ...... | 364/578 |
| 5,986,654 * | 11/1999 | Alexander et al. ........... | 345/349 |
| 6,097,371 * | 8/2000 | Siddilui et al. .............. | 345/164 |
| 6,098,453 * | 7/2000 | Kayfer et al. ................ | 235/383 |

OTHER PUBLICATIONS

The Insight Group, *Developing Visualization Software Applications*, Course Notes, Arlington, VA., 1995.*

* cited by examiner

Primary Examiner—Steven Sax
(74) Attorney, Agent, or Firm—Hickman Coleman & Hughes, LLP

(57) ABSTRACT

The present invention is a hyperspace (10) constructed of cells (12) having paired connectors (14) that define dimensions (16). Complex tissues (78) of the cells (12) in linear and cyclical ranks (32) can be navigated and manipulated by use of a stepper (84) and various view rasters (92). The types of cells (12) may include text cells (174), audio cells (172), video cells, and executable cells (118). By the use of clone cells (68) and a clone dimension (74), the cells (12) may be duplicated or referenced by transclusion.

17 Claims, 19 Drawing Sheets

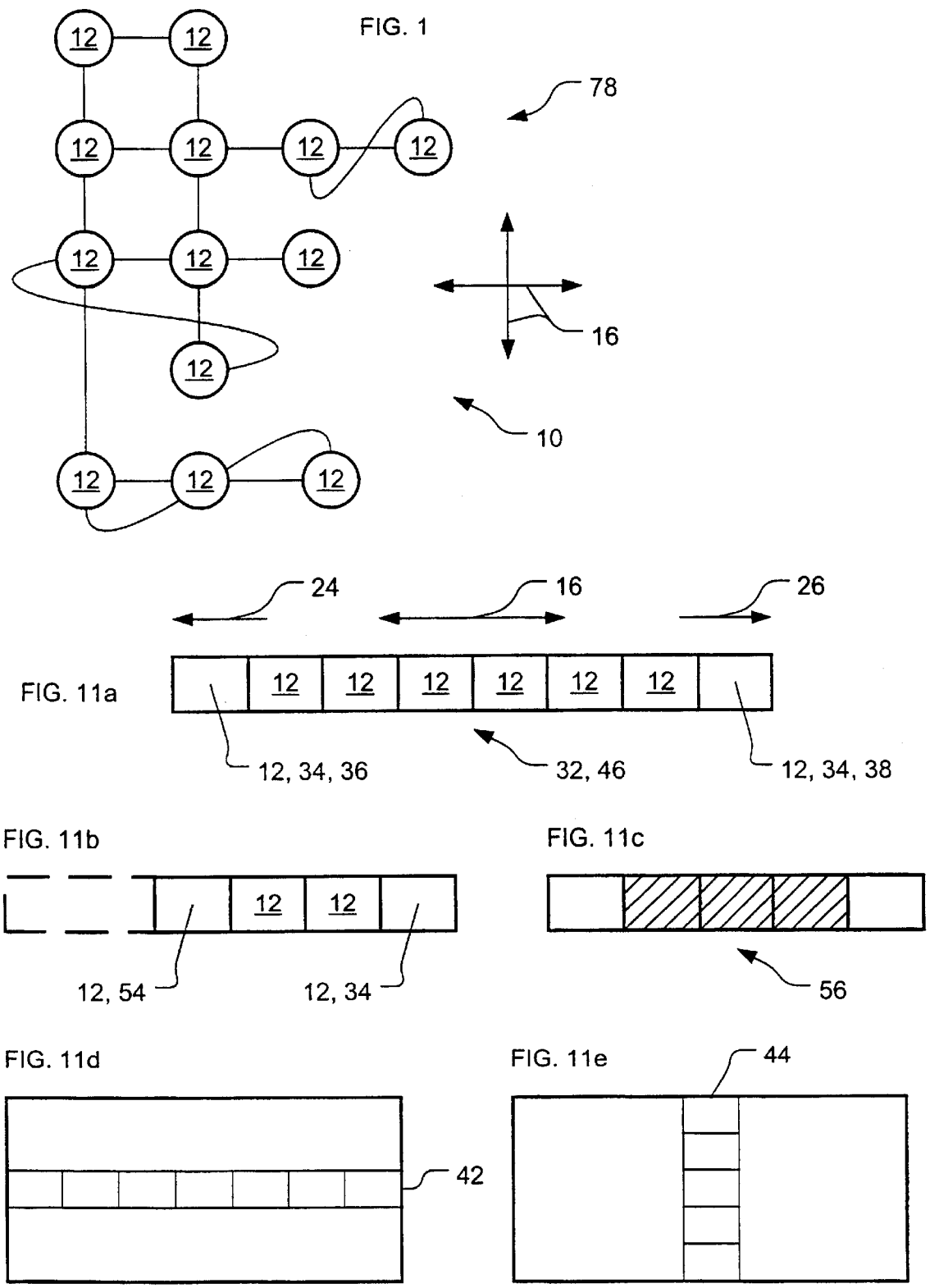

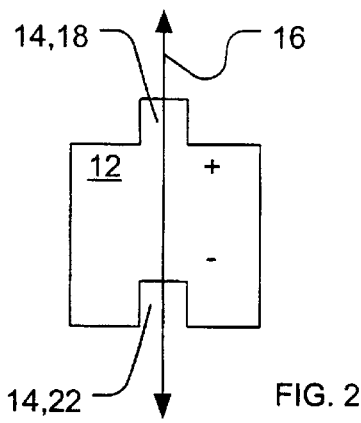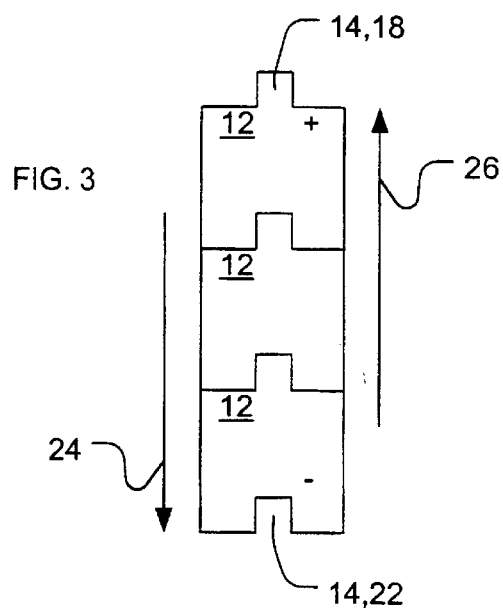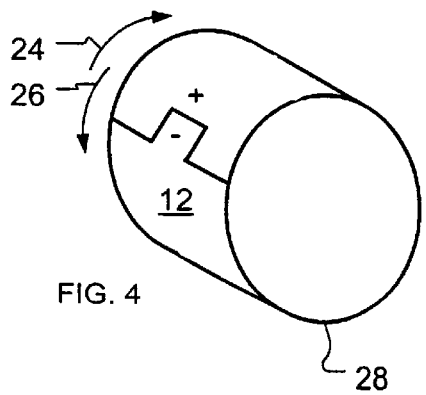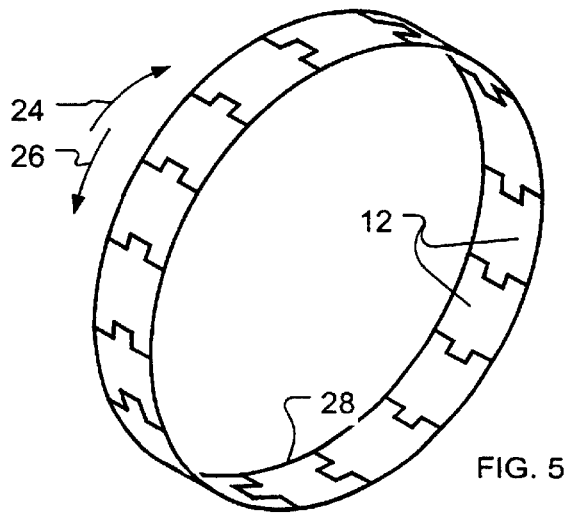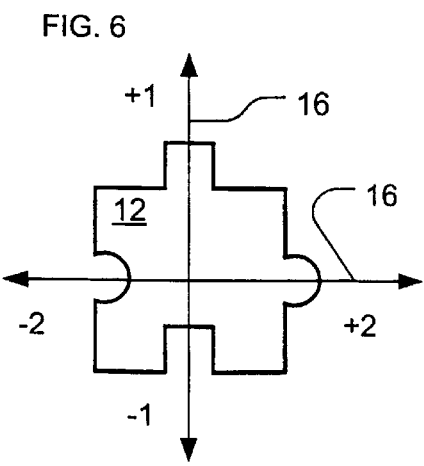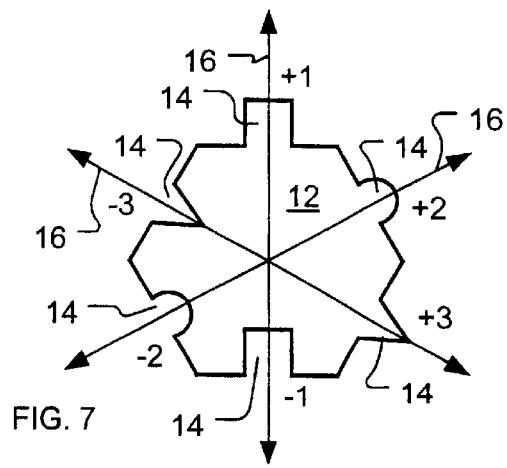

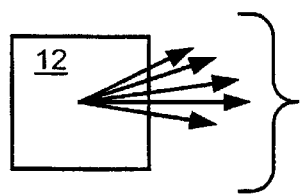
FIG. 8
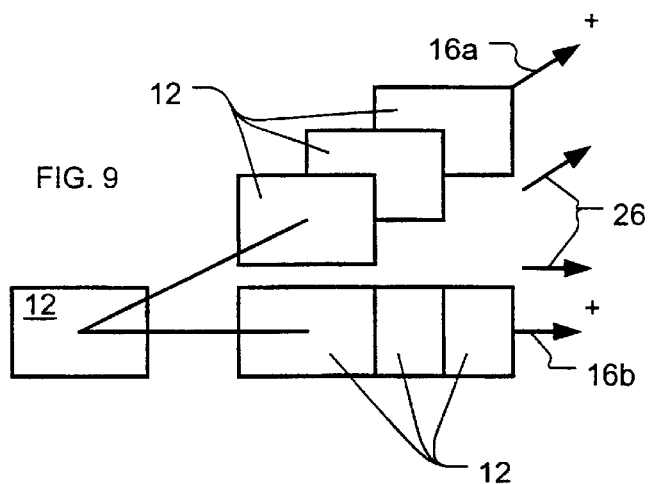
FIG. 9
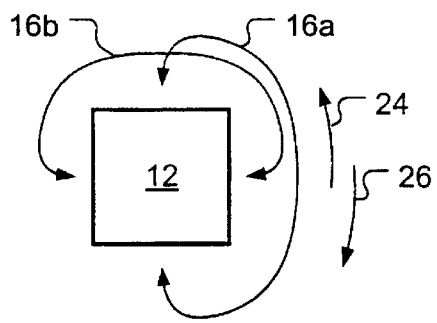
FIG. 10
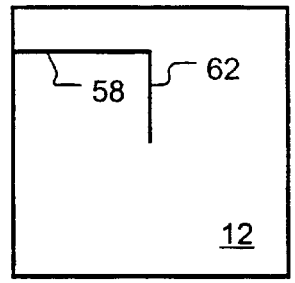
FIG. 12
FIG. 13
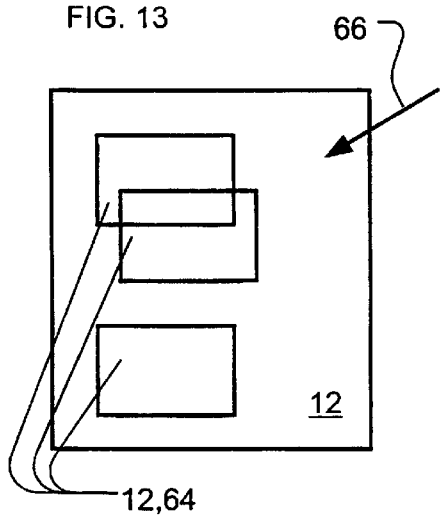
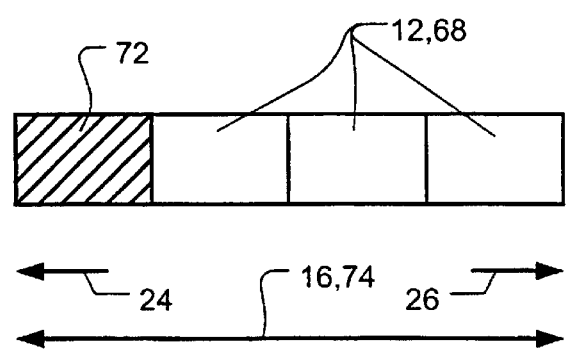
FIG. 14

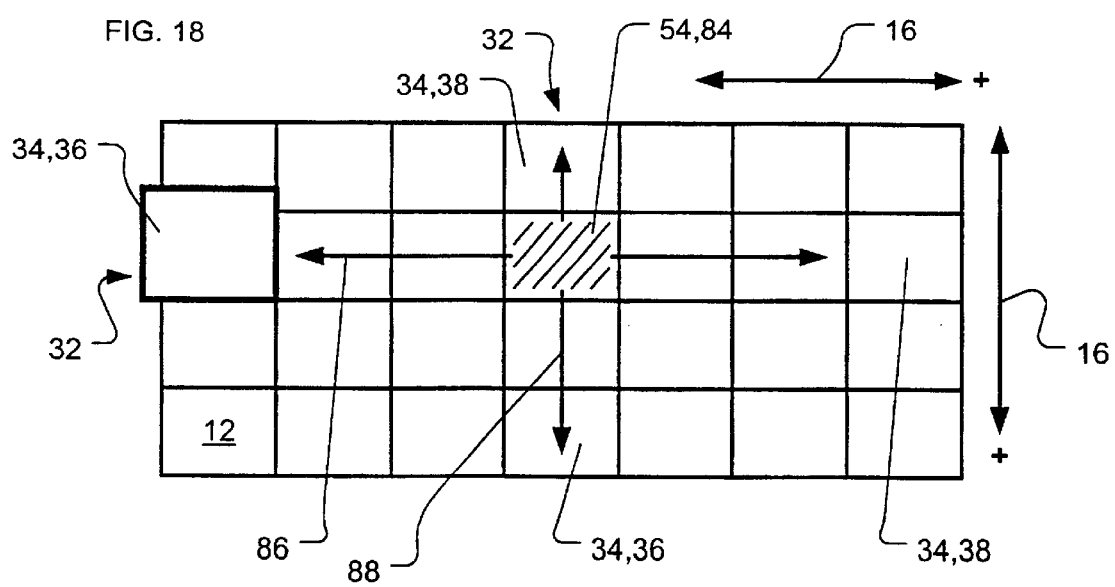
FIG. 18
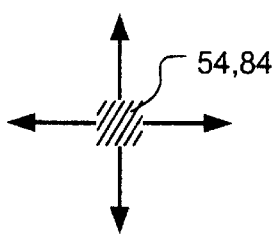 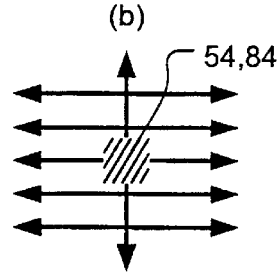 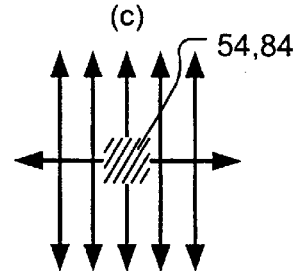
(a)　　　　　　　(b)　　　　　　　(c)
FIG. 19
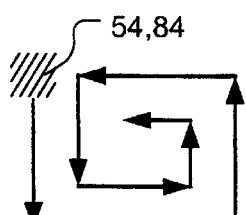 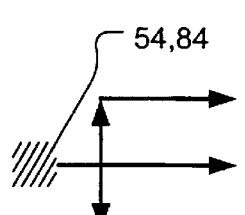 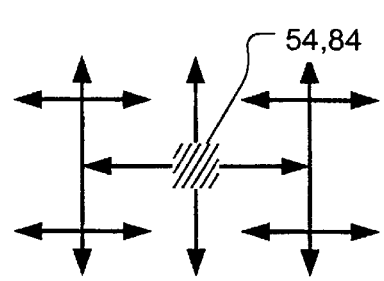
(d)　　　　　　　(e)　　　　　　　(f)

FIG. 20
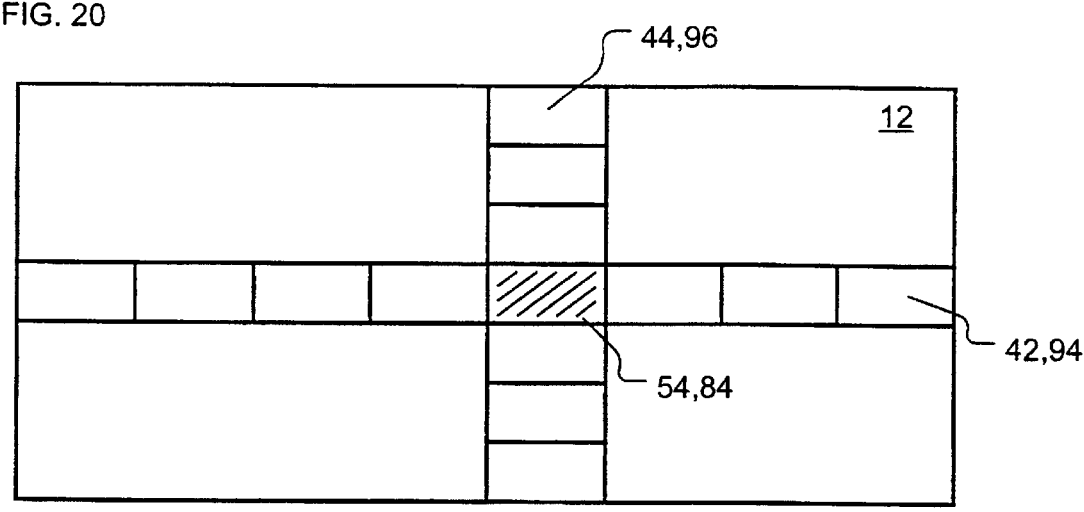
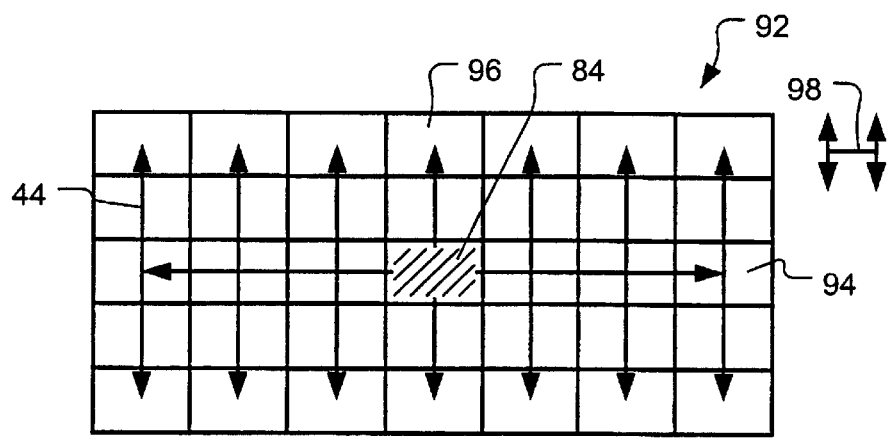
FIG. 21a
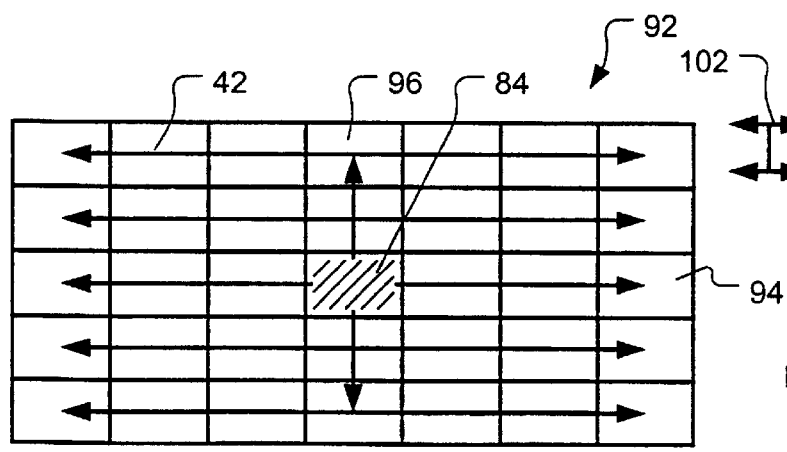
FIG. 21b

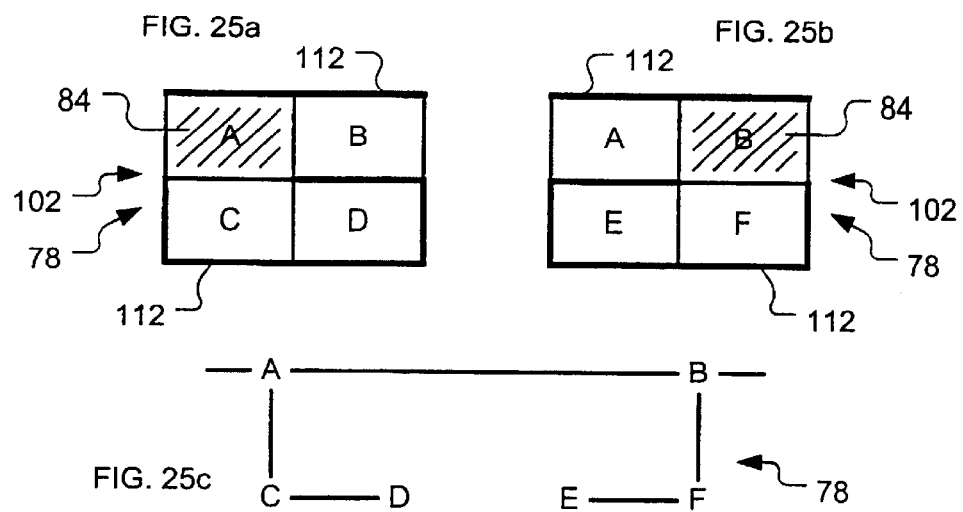
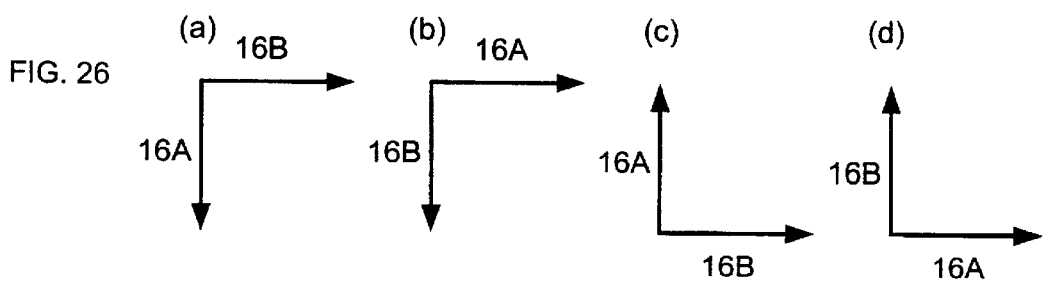
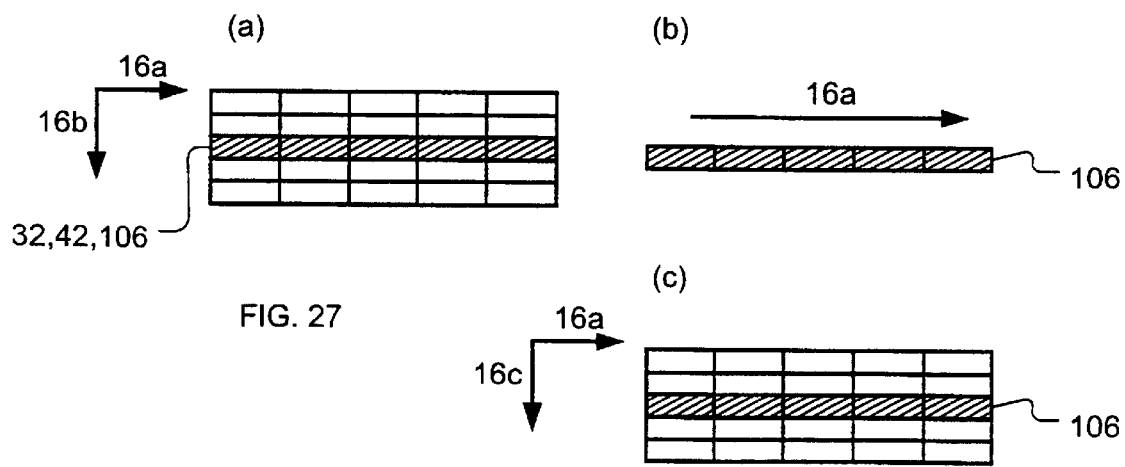

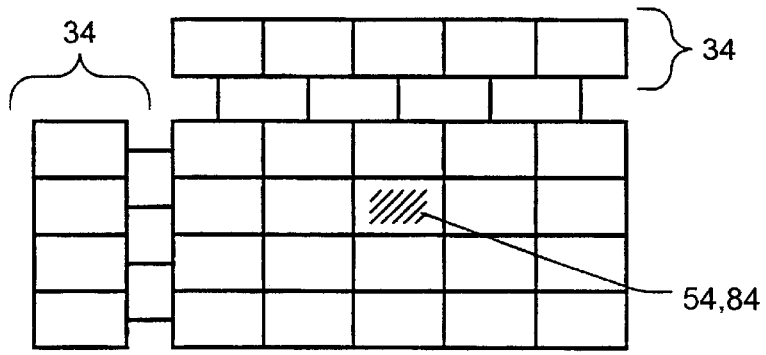
FIG. 28
FIG. 29
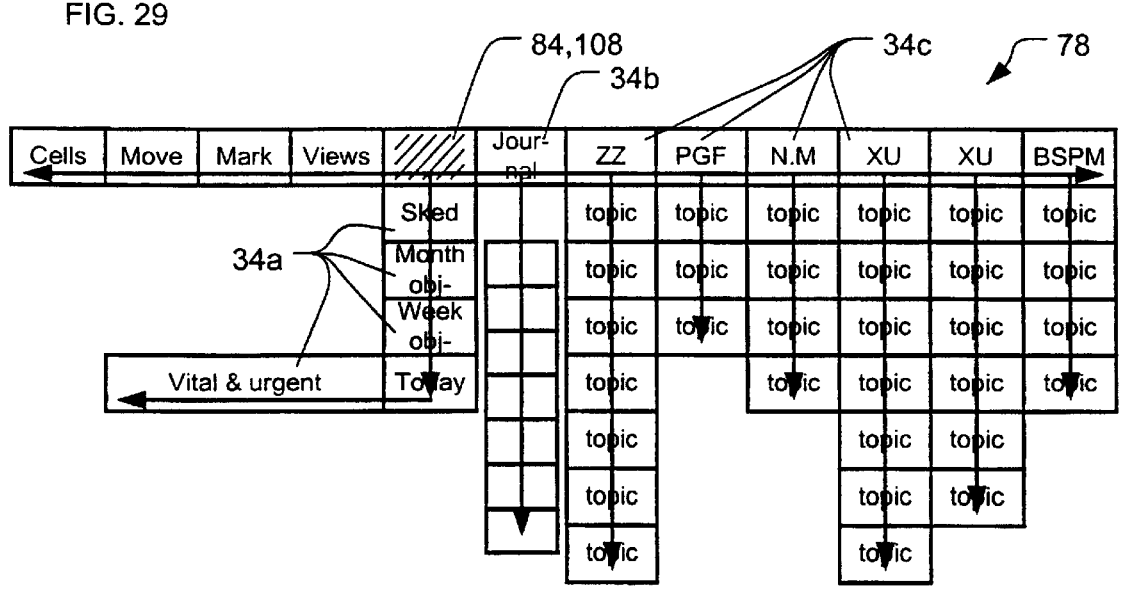

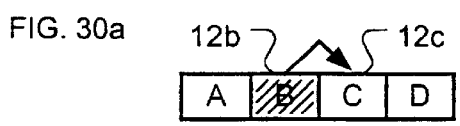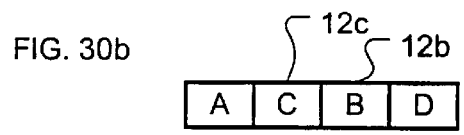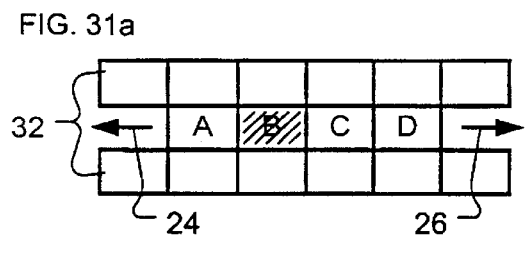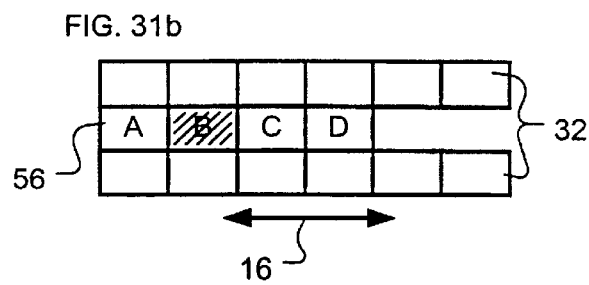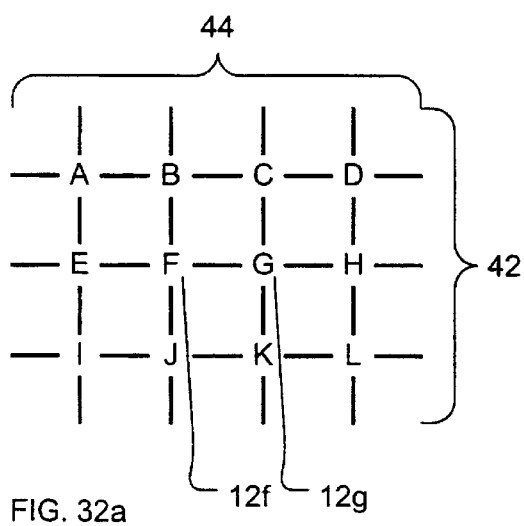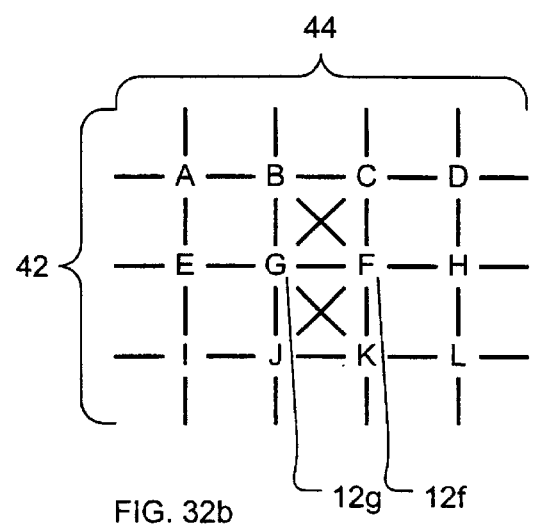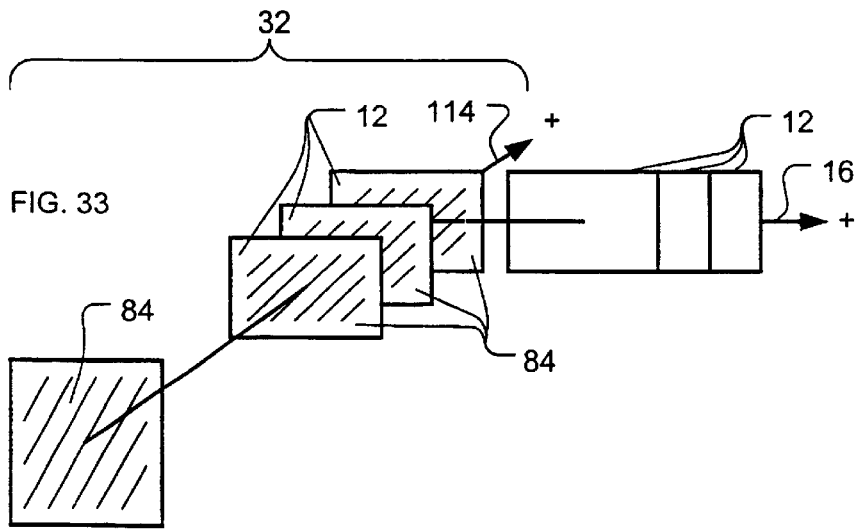

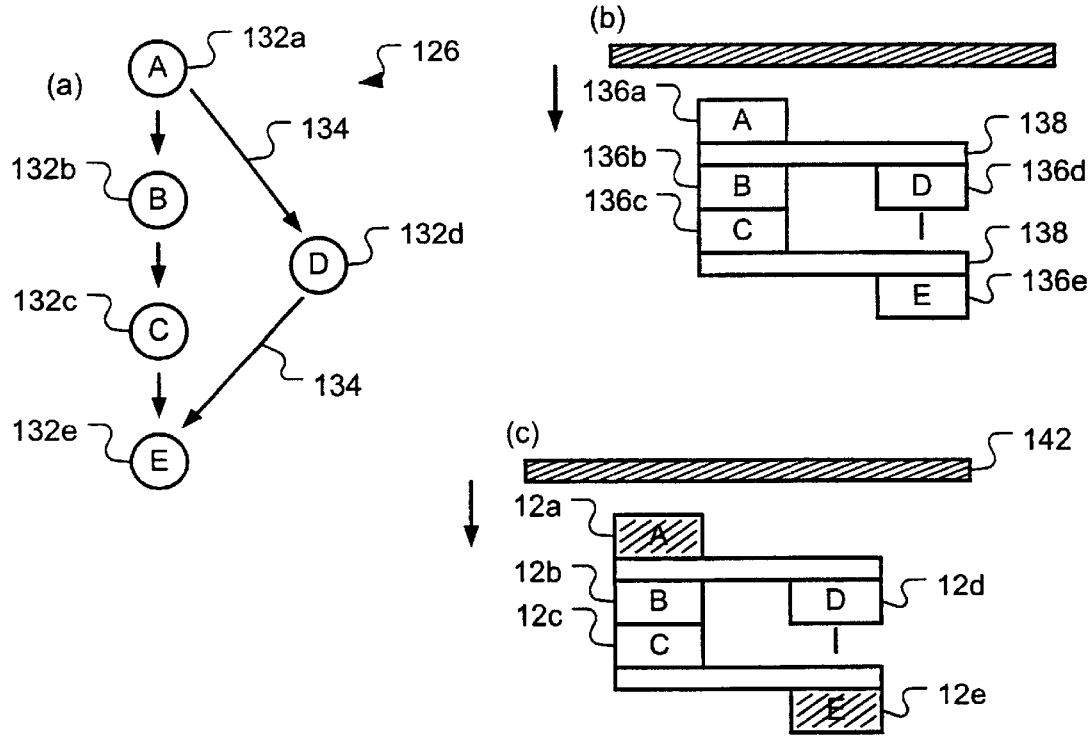

INDIVIDUALS AND COMPANIES

| Staff | data | data | data | data | data | | | | |
|---|---|---|---|---|---|---|---|---|---|
| Actors | data | data | data | data | data | data | data | | |
| Tech | data | data | data | | | | | | |
| Crew | data | data | data | data | | | | | |
| Support | data | data | data | data | data | data | data | data | data |
| FX | data | data | | | | | | | |
| ... | data | data | data | data | data | data | data | data | data |

SHOOTING SCHEDULE X SCENE (In hours)

|  | Day 1 | Day 2 | Day 3 | Day 4 | Day 5 | Day 6 |
|---|---|---|---|---|---|---|
| Scene 1 |  |  |  |  | 6 |  |
| Scene 1 Inserts | 1 |  | 2 |  |  | 1 |
| Scene 2 | 6 |  |  | 8 |  |  |
| Scene 2 Inserts |  |  |  |  |  | 2 |
| Scene 3 |  | 4 |  |  |  |  |
| Scene 3 Inserts |  |  |  |  |  | 2 |

INTERACTIVE CONNECTION, VIEWING, AND MANEUVERING SYSTEM FOR COMPLEX DATA

This application is a 371 of PCT US/98/24334 filed Nov. 15, 1998, which claims priority to Provisional Application 60/065,965 filed Nov. 15, 1997.

TECHNICAL FIELD

The present invention relates generally to computer and microprocessor based systems for storing and manipulating data, and more particularly to a system for handling complex data relationships. The inventor anticipates that primary application of the present invention will be for operations on data traditionally handled in computerized text systems, spreadsheets, databases, and directory windows as well as in user menu based control of appliances using microprocessors. Examples of existing devices which may employ the invention include personal computers (PCs), personal digital assistants (PDAs), video cassette recorders (VCRs), and microwave ovens. However, the present invention is also well suited for use in other existing devices, and in many emerging and potential devices as well.

BACKGROUND ART

Software for use on personal computers and mainframe terminals today is often touted as providing user ease and as having component based simplification. Instead, the reality is that complexity in such is daunting and continues to escalate. In such systems there are many things to memorize, and great inconsistencies which complicate this. Further, the overall visualization of one's working circumstances and the interrelations of files and directories in such systems are difficult for everyone.

Attempts to unify (so-called "integrated software") have been hampered by the difficulty of finding any kind of conceptual unification. One unifying visualization, the spreadsheet, has been greatly influential in this regard, partly because it brought a new overview of data. But because of spreadsheet's rectangular constraints—the idea that the data structure itself must somehow correspond to a rectangular array, itself on a sheet of paper—larger spreadsheets become less and less visualizable or useful, with more and more necessary empty space. Using such existing approaches, unified data thus becomes artificially disconnected, and forced into hierarchical structures and conventional files, which in turn become increasingly tangled.

At the operating system level, computer simplification has been pursued through such mechanisms as "icons" and "metaphors" in the much-praised interfaces of the MACINTOSH™ and WINDOWS™, but most of the functions in these systems must be reached in other ways, particularly through the memorization of many unrelated commands and functions.

At the applications level, the distinctions among software types, e.g., "word processing," "spreadsheet," "database," etc., are more apparent than real. But despite this, software today is largely inconsistent and divided into dissimilar "applications," meaning isolated areas of function. These have been built around what have become traditions and expectations of computer work and filing. But even within those traditions, the present inventor believes that what is needed is a consistent and principled basis for information work, allowing data to be connected according to its own real shape, and allowing it to be visualized as flexibly as possible.

The above discussion of personal computers and mainframe terminals is, however, just a small part of a very rapidly increasing problem today. As computers have been reduced to microprocessors, and as such microprocessors are increasingly integrated into appliances other than computers, the need to deal with information work in these contexts arises as well. Two very ready examples of microprocessor based appliances that need improved information work capability are video cassette recorders (VCRs) and microwave ovens. In these complex everyday appliances, navigating the control menus and inputting user data are forms of information work which large numbers of existing and potential users simply find impossible to master. These are tasks which are basically well within the intellectual capability of the users, put which existing systems have so complicated that the uses are overwhelmed.

While much work on the hardware of appliance interfaces needs to be done, and examples such as personal digital assistants (PDAs) are increasingly showing that such is possible, the problem will not be solved until users can visualize what they are doing within such interfaces. But today's large, and largely empty, rectangular data structures are not going to be able to do this, particularly not in small appliance interfaces.

Accordingly, what is needed today is a consistent structure for the rich visualization and easy manipulation of complex data.

DISCLOSURE OF INVENTION

Accordingly, it is an object of the present invention to provide a system for viewing and manipulating complex structures of data.

Another object of the invention is to provide a system for collecting data into complex structures, and for then viewing and working on such structures.

And, another object of the invention is to provide a system for viewing and manipulating complex structures of data in a very visually compact manner.

Briefly, one preferred embodiment of the present invention is a method for visualizing data on a display by placing the data in cells where each cell has at least one matched pair of negative to positive connectors. This defines dimensions in which the cells may connect with connectors on themselves or other cells. The cells are then placed into a tissue having a plurality of the dimensions which are orthogonal. One or more views of portions of the tissue are then displayed, having at least two of the dimensions displayed in a view. One cell is designated a current cell, and becomes the center of presentation in each respective view. Which cells appear in the views is controllably changed by selectively picking another cell to be the current cell, which accordingly moves the center of presentation within the various views and changes the portion of the tissue appearing in the views. Which dimensions appear in a particular view are controllably navigated to by selectively picking another dimension defined for the current cell, and rotating it to become a dimension in a view, thereby also changing the portion of the tissue appearing in that view.

An advantage of the present invention is that it provides a highly simplified and interactive means to collect, edit, view, and maneuver within arbitrarily complex structures of data.

Another advantage of the invention is that it avoids the limitations of traditional orthogonal grid-based data structures. The invention provides entirely new ways for users to visualize data and its relationships, yet to do so highly compactly, selectively, and customizably.

Another advantage of the invention is that it can be adjusted to represent connections of any complexity, but with the special advantage that the data may always be viewed orthogonally, as rows and columns, in table-like and spreadsheet-like ways.

And, another advantage of the invention is that it is widely, and consistently, applicable to a very wide range of "processor" based technology, ranging from complex multiprocessor computer systems to personalized computer systems to simple microprocessor based appliances.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIG. 1 is a schematic representation presenting basic elements of the inventive hyperspace;

FIG. 2 schematically depicts a single cell having paired connectors defining a dimension;

FIG. 3 schematically depicts multiple cells, connected negative to positive, defining negward and posward directions;

FIG. 4 schematically depicts a single cell in a connective loop with itself, with negward and posward defined as circular directions;

FIG. 5 schematically depicts a series of cells in a connective loop;

FIG. 6 schematically depicts a geometric model for a cell with two connector pairs, and thus two dimensions;

FIG. 7 schematically depicts a geometric model for a cell with three connector pairs, and thus three dimensions;

FIG. 8 schematically depicts how a cell is simultaneously in all of the dimensions which it participates in;

FIG. 9 schematically depicts a cell participating in two different dimensions, connected posward to cells on each dimension;

FIG. 10 schematically depicts a cell connected to itself in two dimensions, and therefore participating in both dimensions;

FIG. 11a schematically depicts a rank, FIG. 11b depicts a half-rank, FIG. 11c depicts a strip, FIG. 11d depicts a row, and FIG. 11e depicts a column;

FIG. 12 schematically depicts that a cell may contain as its first element a contain dimension, and proceeding from that an embrace dimension;

FIG. 13 schematically depicts that cells can contain other cells, and appropriate cells may be executed by invoking an execute command;

FIG. 14 schematically depicts the relationship of a clone of a cell to its master cell on a clone dimension;

FIG. 18 schematically depicts a simple orthogonal visualization of ranks in a grid of cells, with the current cell marked by a stepper;

FIG. 19a–f schematically depict six different possible views of cells, as they are presented or refreshed from a current cell, marked by a stepper;

FIG. 20 schematically depicts a view raster as a simple cross shape;

FIG. 21 a–b schematically depict in detail two significant refresh rasters or sequences of cell presentation, an H-raster in FIG. 21a and an I-raster in FIG. 21b;

FIG. 25a–c schematically depict paradoxically how different I-views in FIG. 25a and FIG. 25b may actually be of the same structural tissue of cells in FIG. 25c, depending on the position of a stepper;

FIG. 26a–d schematically depict four different types of raster flips in two dimensions;

FIG. 27a–c schematically depict the stages of operation of view rotation performed on a two-dimensional grid view, replacing one dimension in a view with another;

FIG. 28 schematically depicts a floating-headcell screen arrangement, providing a labeling function;

FIG. 29 schematically depicts an idiosyncratic refresh raster, or presentational sequence, in an arrangement similar to a complex gameboard;

FIG. 30a schematically depicts a before stage, and FIG. 30b depicts the after stage for the structural operation of jump;

FIG. 31a schematically depicts a before stage, and FIG. 31b depicts the after stage for the structural operation of slide;

FIG. 32a schematically depicts a uniform tissue of cells having the same connective structure as a spreadsheet, and FIG. 32b shows the result of a jump operation performed on the tissue of FIG. 32a;

FIG. 33 schematically depicts the way in which several steppers relate to cells in another dimension;

FIG. 36a shows a schedule as a PERT chart, FIG. 36b shows the same schedule as a Planalog chart, and FIG. 36c depicts the same schedule using the invention;

FIG. 37a depicts the invention's presentation of one view of a database, and FIG. 37b depicts an alternate presentation of the same database;

BEST MODE FOR CARRYING OUT THE INVENTION

Figure 15:
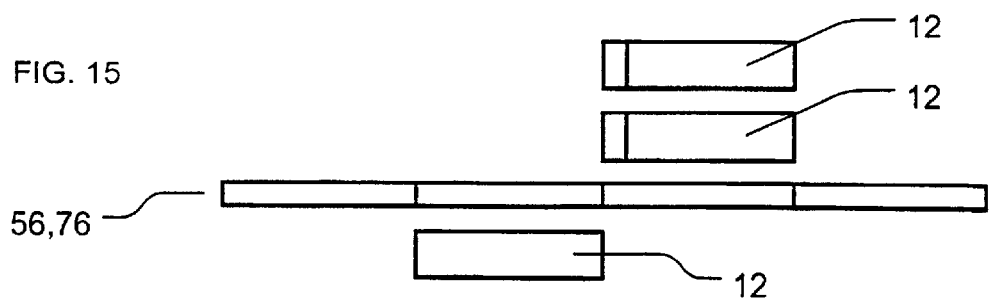
FIG. 15 schematically depicts how a vink is a strip of cells kept connected and used as a pusher, divider or other functional object.

A preferred embodiment of the present invention is a means for defining and operating upon a quantum hyperspace which is defined by its geometry of connection. As illustrated in the various drawings herein, and particularly in the view of FIG. 1, preferred embodiments of the invention are depicted by the general reference character 10.

FIG. 1 is a schematic presenting some of the basic elements of the inventive hyperspace 10. A "space" is defined as a set of relations and the structures allowed within that set of relations. The hyperspace 10 may contain linear chains of cells 12, which are the basic unit of the hyperspace 10. The cells 12, and their manner of interconnection with connectors 14 (FIG. 2) introduces a notion of dimensions 16. The inventive discrete hyperspace 10 has no existence separate from what it contains. What is of interest in it is the way in which it may be shown, and mapped to arbitrary relational structures.

FIG. 2 depicts how one may imagine a cell 12 as a geometrical figure with paired connectors 14 in one dimension 16. Here the cell 12 has just one matched pair of connectors 14, which can be viewed as extending in two directions, "posward" ("+") and "negward" ("−"). Thus, each pair of connectors 14 consists of a positive connector 18 which is posward, and a negative connector 22 which is negward. A cell 12 may have many different types of pairs of connectors 14, but it will usually have two of each type, the positive connector 18 and the negative connector 22. (Endcells may have only one connector, and are discussed below.)

FIG. 3 depicts how the cells 12 may be connected to each other by none (FIG. 2), one or both of the connectors 14 of a same complementary type. If the positive connector 18 is of type A in a particular cell 12, it may only be connected to a negative connector 22 which is also of type A. But it may be connected to a negative connector 22 of type A on any cell 12, including itself. The cells 12 shown here are connected positive-to-negative, thus again defining the two directions: negward 24 and posward 26. FIG. 4 depicts how a single cell 12 way even be placed in a connective loop 28 with itself, showing that negward 24 and posward 26 remain validly defined directions even when circular. FIG. 5 depicts this concept taken a step further, with a series of cells 12 in a connective loop 28 having negward 24 and posward 26 still validly defined as circular directions.

FIG. 6 depicts how one may also imagine a cell 12 as a geometrical figure with paired connectors 14 in two dimensions 16. And FIG. 7 shows this for three dimensions 16. The cells 12 may exist in any number of dimensions 16, but for more than three dimensions 16 it becomes impractical to draw such cells 12 on paper.

FIG. 8 depicts how a cell 12 exists in every dimension 16, and so may be viewed simultaneously in every dimension 16 which it participates in. Users may typically only want to see two or three dimensions of connections for a cell 12 at once. It can be said that a cell 12 "participates" in a particular dimension 16 if it has one or two connectors 14 in that dimension 16.

FIG. 9 depicts that a cell 12 participating in two different dimensions (16a, 16b), is connected posward 26 to cells 12 on each. A cell 12 may even participate in any number of dimensions 16 by connecting to itself in those dimensions 16, as shown in FIG. 10. Summarizing, a "dimension" is an independent relational ordering in which negward 24 (and its complement, posward 26) are defined. Thus a particular dimension 16a is independent of any other dimension 16b, etc. It follows that negward and posward in dimension 16a are unrelated to negward and posward in dimension 16b.

FIG. 7 also depicts that a cell 12 may have any integer number of paired connectors 14, which for convenience can be referred to by any label (here numbers) preceded by a positive or negative sign. Thus, connectors 14 in particular dimensions 16 may be labeled +1 and −1, +2 and −2, +3 and −3. Or alternate labels may be used, e.g., +a and −a, +stack and −stack, +Fred and −Fred. FIG. 3 includes a depiction of how each connector 14 of a cell 12 may be linked to any other connectors 14 with the same label and the opposite sign, in a "jig-saw puzzle" manner.

FIG. 11a–e introduce some additional definitions for the inventive hyperspace 10. A rank 32 is a consecutive set of cells 12 which are connected in a given dimension 16, and which extend between two endcells 34, a negend 36 (which can also be termed a "headcell") at the extreme negward 24 end and a posend 38 at the extreme posward 26 end. This should not be confused with a row 42 (FIG. 11d, a horizontal view of a rank 32) or a column 44 (FIG. 11e, a vertical view of a rank 32). If the endcells 34 of a rank 32 are connected, it is a ringrank, but it may be considered for convenience to still have a negend 36 and a posend 38. If, starting from any given cell 12 in the rank 32, the successive connections in a given direction reach that cell 12 again, the rank 32 is a cyclical rank or ringrank (see e.g., FIG. 4 and FIG. 5). A half rank 52 is a consecutive set of cells 12 which extend in a given dimension 16 from a current cell 54 to an endcell 34. A strip 56 is a consecutive subset of a rank 32, but it may or may not be an entire rank 32.

All relations within the hyperspace 10 may be kept to the geometry and set of relations described above. However, several special adaptations can be made to work within the inventive hyperspace 10.

FIG. 12 shows schematically how the relation of containment may be defined on a special dimension, termed the containment dimension 58. To achieve consistency, another dimension may be added, termed the embrace dimension 62. A cell 12 contains as its first element the first cell posward on the containment dimension 58, and the rest of the content listing proceeds posward from this first element on the embrace dimension 62. However, by interpretation all of this is deemed to be inside the cell 12.

Since a cell 12 may contain other cells 12, FIG. 13 shows that a subcell 64 is a cell 12 inside another cell 12 (by means of the containment dimension 58, and optionally the embrace dimension 62). A subcell 64 may be connected like any other cell 12, regardless of whether they too are subcells 64. A subcell 64 may be connected to its containing cell 12 in any way, which provides powerful capabilities like recursion. FIG. 13 also shows that an execute operation 66 (depicted by an arrow) directed at a cell 12 can cause execution of the subcells 64 in that cell 12.

FIG. 14 shows the relation of a clone cell 68 to its master cell 72 on a clone dimension 74. A clone cell 68 is a remote instance of a cell 12 in another context. However, it is possible to go not merely from the instance to the master (as with conventional software instances) but from the master to all instances (thus making it a "transclusion" in the sense explained in the present inventor's books "Literary Machines" and "The Future of Information"). Each clone cell 68 has the values (except for location) of its master cell 72. To find all of the clone cells 68 from a given master cell 72, one travels from it posward 26 along a clone dimension 74. To find the master cell 72 for any clone cell 68, one travels from it to the negend 36 on the clone dimension 74.

Since subcells 64 (FIG. 13) are exactly like other cells 12, portions of a cell 12, i.e., subcells, 64, may be cloned just like any other cells 12. This includes the data, its program, or any other values or contents of a cell 12. This particularly allows cells 12 to share contents by cloning or transclusion.

Sometimes a number of cells 12 need to be brought together in parallel for viewing or operation. In this case strips 56 of cells 12 are allowed to function as mechanical objects. Borrowing the term "vinculum" from arithmetic— where it usually means the line dividing numbers to be added or multiplied from their result below—one can give such objects special status, as shown in FIG. 15. A vinculum, or vink 76 (or a dam) is a strip 56 of cells 12 kept connected and used as a pusher, divider or other functional object, especially for gathering and selecting cells 12.

Figure 16:
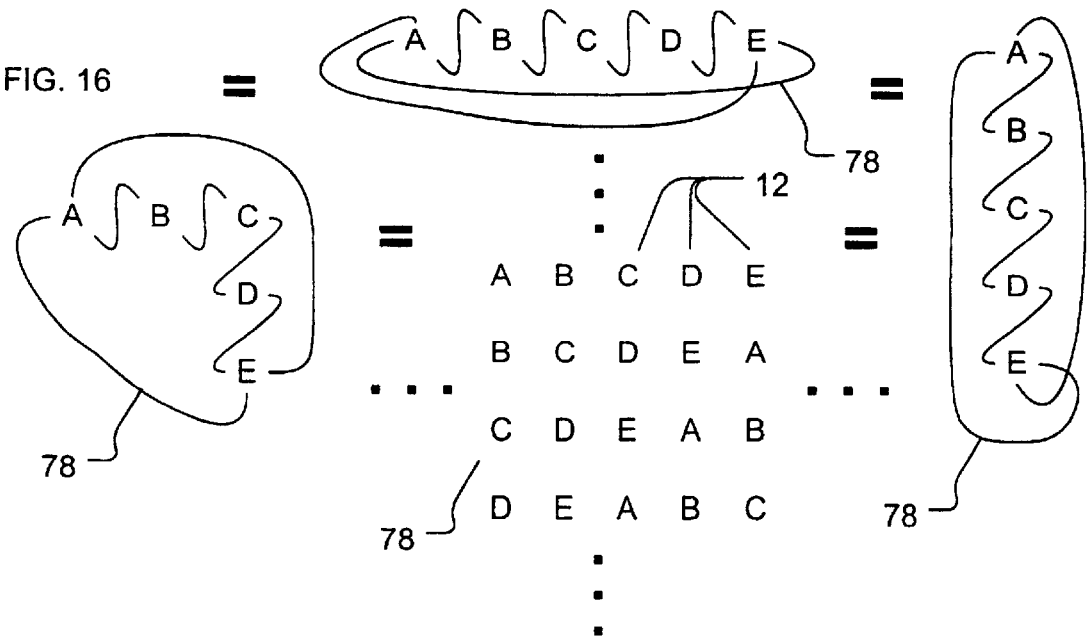
FIG. 16 schematically depicts bow a particular connective tissue of cells may be illustrated in markedly different (but equivalent) ways.

A specific set of connections among cells 12 forms a structural tissue 78, having a particular form and arrangements. For instance, FIG. 16 depicts how a particular connective tissue 78 of five cells 12 ("A" through "E") may be illustrated in many different (but equivalent) ways. All connections between cells 12 here are 1-to-1 untyped connections, followable in either direction. However, typed connections may be variously modeled by multiple dimensions 16, clone cells 68, vinks 76 or other means.

There are some apparent paradoxes for some of the geometry and visualization methods usable with the inventive hyperspace 10, but these have to do with flat-paper expectations. For instance, returning to FIG. 5, for directions negward 24 and posward 26 to extend in connective loops 28 violates our experience of most spatial relations. However, it is spatially consistent with regard to direction as defined in the inventive hyperspace 10, and it is isotropic (having the same properties in all directions). These are violations of our everyday spatial and connective expectations, but nevertheless the inventive hyperspace 10 is consistent—and useful. That containment may loop (A containing B containing A) also violates common expectations, as does subcells 64 linking to larger cells 12.

For viewing cells 12, a key point is that the types of connectors 14 offer viewing dimensions 16 which may be presented orthogonally. The hyperspace 10 may employ a considerable variety of different views to facilitate understanding and manipulation by users of the information contained in the cells 12 and their connections. There is no fixed or standard view, but rather a variety of quickly-changeable views. Some examples of operations which may be performed on the views are: flip raster, flip cell view, jump stepper, spin dimension, exchange coordinate, reverse coordinate, nail stepper position, release stepper position, and keep showing inactive stepper. Such a list of operations may be presented to users as control buttons or menu items.

Figure 17B:
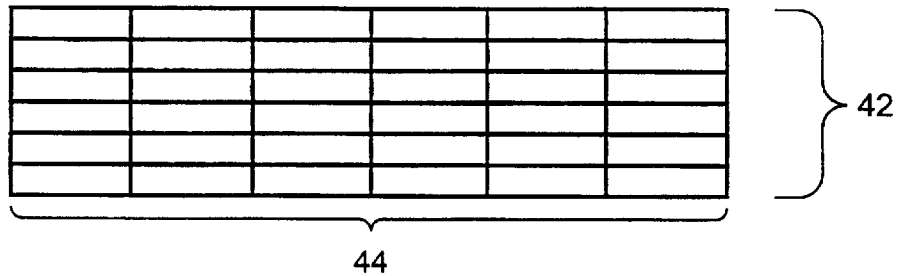
FIG. 17a schematically depicts a uniform-looking row-and-column view, which is actually the irregular structure schematically depicted in FIG. 17b.
Figure 17B:
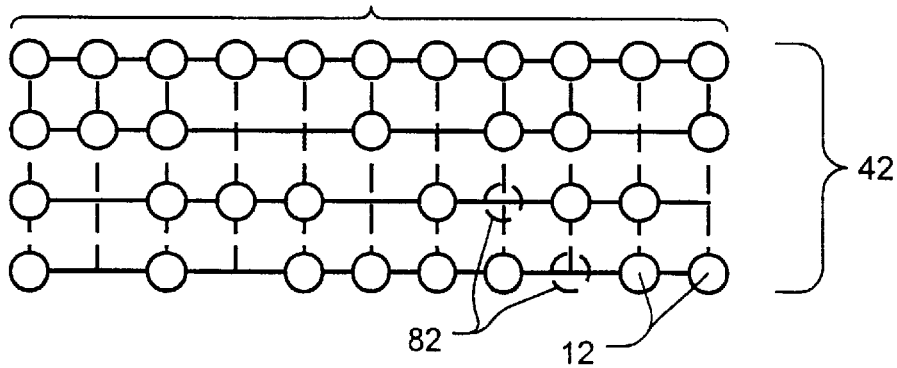

FIG. 17a illustrates how a view of cells 12 may appear very spreadsheet-like, in rows 42 and columns 44. But, as FIG. 17b shows, the underlying data may actually be quire irregular in its manner of connection, although missing cells 82 may sometimes be noticeable. One may then envision view operations such as flips, changes of the direction of a dimension 16 on a screen; rotations, replacement of one viewing dimension 16 by another; viewsteps, moving the center of presentation; and rasters, changing the order of presentation, especially in an orthogonal grid of cells 12. These different views may also be seen in parallel rather than in succession, in different windows on a screen. Naturally, it is up to the user's insight and intelligence not to be misled by such views, and to explore other views as appropriate.

FIG. 18 shows a simple orthogonal visualization of ranks 32 in a grid of cells 12. The current cell 54, at the center of presentation, is marked by a stepper 84 (depicted in the figures consistently as a rectangle of diagonal lines). The two dimensions 16 of this view are the currently-displayed horizontal dimension (H-dimension 86) and the currently-displayed vertical dimension (V-dimension 88). This shows also the negend 36 and posend 38 of the rank 32 for the current cell 54 in the H-dimension 86 and the negend 36 and posend 38 of the of the rank 32 for the current cell 54 in the V-dimension 88.

FIG. 19a–f show some different sequences of possible views of cells 12 as they are presented or refreshed starting from a current cell 54 as the center of visualization, denoted by the stepper 84. The stepper 84 can be moved to create a sequence of presentation, termed a view raster 92 (adapting the word "raster" from the sequences of positions illuminated on a CRT in different hardware display systems). The view raster 92 is a sequence by which particular cells 12 are shown, and where they are shown on a screen. A view raster 92 typically makes a complex set of connections into a two-dimensional or three-dimensional array. The presentation of cells 12 proceeds from the current cell 54 (as a starting point), and goes in different directions and sequences depending on the view raster 92. Of particular note for later discussion are the I-view (FIG. 19b) and the H-view (FIG. 19c).

FIG. 20 illustrates a very simple view, one showing cells 12 in the shape of a cross centered on the current cell 54. In this case the current cell 54, denoted particularly by the stepper 84, is shown first. Then either the row 42 of cells 12 extending leftward and rightward from the current cell 54, or the column 44 of cells 12 extending upward and downward from it are shown. One may call the row 42 emanating left and right from the stepper 84 the current row 94, and the column 44 emanating up and down from the stepper 84 the current column 96. In this example the choice of view raster 92 makes no difference, the I-view and the H-view are the same.

FIG. 21a–b show in detail two significant view rasters 92, referred to as the H-raster 98 and I-raster 102. The H-raster 98 presents the current column 96, then moves along the current row 94 to show the other columns 44 emanating from it. The I-raster 102 presents the current row 94, then moves along the current column 96 to show the other rows 42 emanating from it. The irregular structure of FIG. 17b can be viewed using the H-raster 98 and I-raster 102, to create the uniform-looking row-and-column view of FIG. 17a.

Figure 22A:
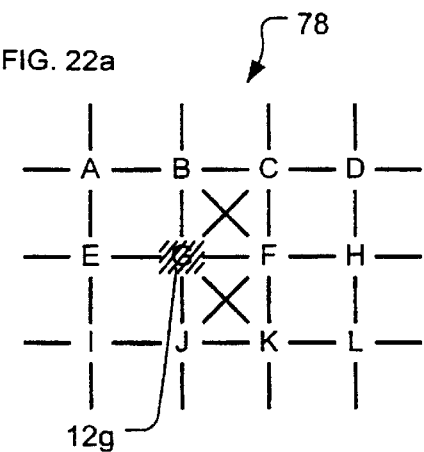
FIG. 22a–c schematically depict how the same structural tissue of cells in FIG. 22a appears in FIG. 22b one way when using the I-raster mode, and in FIG. 22c appears different using the H-raster mode.
Figure 22B:
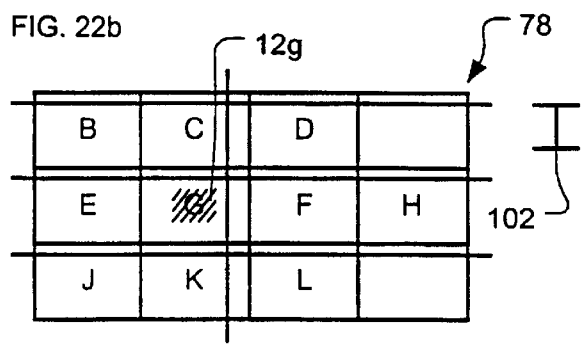
Figure 22C:
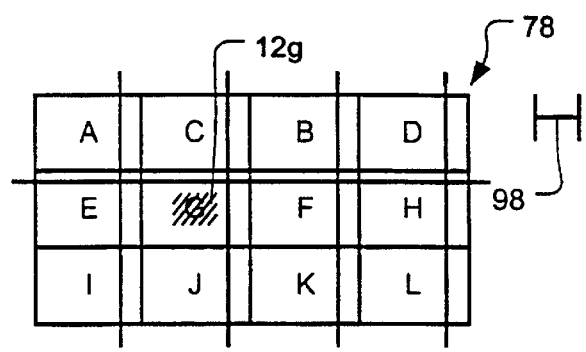
Figure 24:
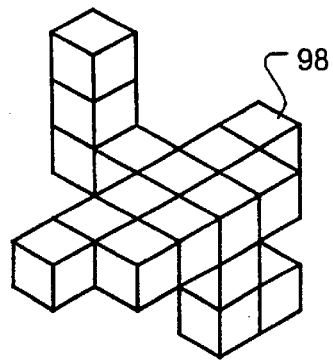
FIG. 24 schematically depicts a view raster in 3D showing cells as 3D blocks.
Figure 23:
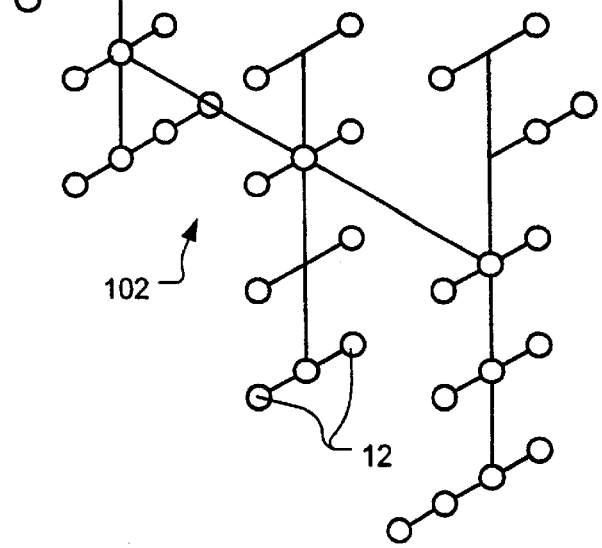
FIG. 23 schematically depicts a view raster in 3D using a ball-and-stick representation.

FIG. 22a–c show the difference between I and H viewing of a particular structural tissue 78 of cells 12, each with the stepper 84 at the same "G" cell 12g. This rastering approach, particularly generalizing the H-raster 98 and I-raster 102, lends itself directly to three-dimensional viewing. FIG. 23 shows an I-raster 102 extended to three dimensions in a ball-and-stick view. FIG. 24 shows a presentation of cells 12 in such a 3D raster as blocks 104.

FIG. 25a–c show two paradoxically different I-raster 102 views of the same structural tissue 78 of cells 12 (as depicted in FIG. 25c), depending on the position of the stepper 84. In FIG. 25a the stepper 84 is at the "A" cell 12a, and in FIG. 25b the stepper 84 is at the "B" cell 12b.

The views of the hyperspace 10 are changeable through flips. FIG. 26a–d depict how raster flip operations may be used to change the assignment of screen dimensions to a dimension 16a and a dimension 16b in the inventive hyperspace 10. It should be noted that for merely two dimensions 16 there are four possible assignments (not counting assigning one dimension 16 to both horizontal and vertical).

The views of the hyperspace 10 are also changeable through rotation into other dimensions. FIG. 27a–c depict a sequence of operations for view rotation in a two-dimensional grid view, to replace a dimension 16b in the view with a dimension 16c. The process consists of picking a rank 32 on the screen (either row or column) as the rank of rotation 106, then continuing to display that rank of rotation 106 while dimension 16b disappears and dimension 16c appears to replace it, showing the connections to that same rank of rotation 106 in new dimension 16c. In this illustration a row 42 in dimension 16a is chosen as the rank of rotation 106, and that row 42 keeps its appearance as the cells 12 connected in dimension 16c replace the cells 12 connected to the same row 42 in dimension 16b.

Other types of rasters are possible in the hyperspace 10. FIG. 28 shows a floating endcell arrangement where endcells 34 are constrained to line up at the borders to provide a labeling function, similar to the horizontal and vertical labeling cells automatically generated at the edges of a conventional spreadsheet, and similar also to the user-inserted labels at the edges of a spreadsheet.

FIG. 29 shows how a complex tissue 78 of shapes can be shown by presentation sequences more complex and specialized than H and I. In particular, an idiosyncratic refresh raster, or presentational sequence, set up particularly to show the tissue 78 all at once is illustrated, starting the presentation at a homecell 108. Such an idiosyncratic refresh raster can be stored in the cell 12 itself, or, if wanted, in more than one part of the tissue 78, or in some other cell 12 and connected to each of the other cells 12 using that raster.

The connections of cells 12 may often be unresolved visually. For instance, cells 12 which are visible may be on ranks 32 which later connect elsewhere on a screen. Or cells 12 in a spreadsheet-like arrangement may cover each other, making it difficult to see where the borders are. This is an issue of display convenience and mental understanding.

It is also a very good idea to show as many characteristics of a tissue 78 as possible, at least for users who wish to see them. For instance, in FIG. 25 the widened borders 112 of some cells 12 were provided as additional visual cues, showing which cells 12 are connected. Various visual cues may help to indicate which cells 12 are connected or unconnected to adjacent cells 12 on-screen, or connected to other cells 12 which are not shown, etc. Other than special borders 112, some examples of such visual cues include edge highlighting, pips and marks, color, size, icons and animations.

The program used for viewing the hyperspace 10 can use variety in its presentation of the cells 12. It can force all of the cells 12 to appear the same (as rectangles, balls and sticks, blocks), or it can impose different icons for particular types of cells 12. Each cell 12 can assert some other preferred viewing mode for looking at it. A cell 12 can of course have an arbitrary screen icon, graphic or animation associated with it, and assert that as its preferred view—say, a rose or a chess knight—but the user should generally be able to override this in the interest of analytical clarity.

Particularly for handling text, the first two main user dimensions 16 of the hyperspace 10 can be termed T1 and T2. The rationale for this is that if text can only be represented in one dimension 16, it is a long ribbon, like that printed on an old-fashioned stock-market ticker-tape. If a second dimension 16 is available for text, it represents successive segments of that long ticker-tape ribbon cut into segments, much as such printed ribbons were cut up and pasted onto telegrams in the early decades of this century. Thus T1 is the first dimension 16 of text, and T2 is the second dimension 16 of text. The reason for not calling these horizontal and vertical is that such dimensions 16 in the hyperspace 10 are instead used for viewing on a screen, and not intrinsically related to the data being viewed. These T1 and T2 dimensions 16 can also be variously rotated. (Note also that the main dimension of Chinese and some Japanese writing, shown vertically, may also be called the T1 dimension, since it is the first dimension of text in those languages.)

Operations on the inventive hyperspace 10 are of two basic types: those which change the view (already discussed) and those which change the structure. The philosophy of the hyperspace 10 is to do as much as possible by view operations, which simplifies many things. However, structure operations are also very important, and particularly include stepper 84 operations such as the following.

FIG. 30a–b show before and after stages, respectively, of a basic structural operation and reconnective move termed the jump (or "hop"). In the jump, the "B" cell 12b exchanges places with the "C" cell 12c. FIG. 31a–b show before and after stages, respectively, of another basic structural operation and reconnective move termed the 2-sided slide (or "chug"). In the chug, an entire strip 56 or rank 32 moves in relation to its neighboring ranks 32, either negward 24 and posward 26 in some dimension 16. In this move, each cell 12 in the strip 56 has the connections to its neighbors in that dimension 16 broken and reconnected with those that existed for each cell 12 which is one further along. A 1-sided slide, called a shear, is also possible, in which only half of these changes occur on one side.

FIG. 32a shows a uniform tissue 78 of cells 12 which happens to have the same connective structure as a conventional spreadsheet. FIG. 32b shows the result of a jump operation on this tissue 78. The "F" cell 12f has hopped over the "G" cell 12g (or vice versa), resulting in a new structure. The top and bottom rows 42 are unchanged, and all the columns 44 are unchanged, though the drawing might suggest otherwise. The only changed connections are in the center row 42.

Operations of steppers or cursors are generally considered to be view operations in almost any system. Cursor operations are conventionally used for user viewing and marking places where action is to occur. However, in the hyperspace 10 the operations of the stepper 84 are structure operations. In the hyperspace 10 cursor type operations are instead generalized to "steppers," which are flags, place markers, and switches.

The basic move of a stepper 84 is, of course, from cell 12 to cell 12. Visually this may be interpreted as being "inside" the cell 12, so that the cell 12 lights up whenever the stepper 84 reaches it. However, for complete consistency, the hyperspace 10 may define the stepper 84 itself as a cell 12, connected to other cells 12 in its own stepper dimension 114. Thus, while by interpretation appearing inside a cell 12, the stepper 84 is geometrically (in hyperspace) a neighbor to that cell 12 in a stepper dimension.

FIG. 33 shows the way in which several steppers 84 (via the stepper dimension 114) relate to cells 12 in another dimension 16 (say a stack dimension). A number of steppers 84 may be on a given cell 12 at any particular time. The steppers 84 connect to the cell 12 on the stepper dimension 114, and are all (by interpretation) deemed to be on, or in, the cell 12. Thus a rank 32 of several steppers 84 may simultaneously "occupy" a cell 12.

This is necessary for another of the stepper operations, stepper fork. When the user (or a program) requests a stepper fork operation, a second stepper 84 appears on the same cell 12. The user may then move either stepper 84, and they become independent.

A complementary operation is stepper kill, which ends the life of a stepper 84, causing the next stepper 84 in line posward to become the current stepper 84. (The list of how to cycle through steppers 84 can, of course, be a list of cells 12 with clones of each stepper 84.)

Any new operation can define the use of multiple steppers 84, which appear during the course of the operation, and move either under user or program control across the information tissue 78. The steppers 84 associated with particular operations can be used to select, mark, delete, and add cells 12 in particular places, or to measure various ranks 32 or to enact ZigZagging gridwalks, etc. in the hyperspace 10. (A gridwalk is a sequence of positional moves in whatever succession of dimensions, stepping some number of cells in one dimension, then some number of cells in another, etc., to fulfill some function, reach some destination, etc.)

Note, in the preferred embodiment having a special stepper dimension 114 precludes putting steppers 84 on steppers 84. But slightly more complex embodiments of the inventive hyperspace 10 can even permit that.

Discussion now turns to operation of the inventive hyperspace 10 in the context of some particular applications. This invention, with its geometry and the viewing capability which it provides, is particularly versatile because it is uniform, viewable orthogonally, and tames many of the complications of arbitrary connection into at least the orderliness of rows 42 and columns 44, which can be both seen by users and worked on automatically in rational ways.

Most existing systems, particularly computer systems, can be extended. This hyperspace 10 offers a broad variety of extensibility methods, depending on the forms of visualization and manipulation desired. These include new cell 12 types; new dimensions 16; new viewing modes; new structure operations; new zones of the tissue 78; new vinks 76; clone cells 68; cell programs; and, of course, new programs to manipulate the cells 12, which may themselves be enclosed in cells ("cellprograms") and may be composed of other cells and/or their clones.

These methods may be used to extend systems parsimoniously and tightly, rather than with the sprawling additions that are made commonly in the commercial software field today. In particular, the blight of ever-widening and ever-separating applications. Instead of independent, separate and inconsistent applications, the hyperspace 10 offers tight extensibility under the same rules.

New dimensions 16 are of particular interest. A dimension 16, as chosen for viewing and representation by the sophisticated user, is some relationship which the user wants to see together arrayed in parallel) or apart (i.e., broken out into parallel ranks 32 for contrast). Thus adding new dimensions 16 is an important part of creating new visualizations.

It is easy to add new viewing modes, according to which cells 12 show themselves in either some new individual visualization or some new connective pattern, or both. Ideally each such viewing mode can be added to a stack, so that the user may quickly step through to get the most useful or enjoyable view. In particular, one control can be reserved for such rapid stepping through viewing modes.

Figure 34:
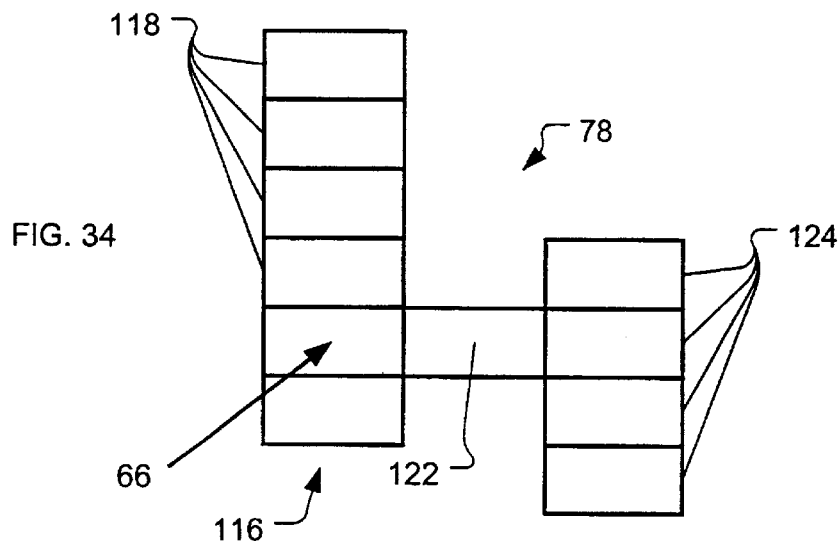
FIG. 34 schematically depicts how menus are simply the executable cells in a tissue of cells.

FIG. 34 depicts how menus 116 are representable as executable cells 118 in a tissue 78 of cells 12. The menu options 122 in such a scheme become connected cells 124, wherein reside certain choices have been set by the user (either as the contents of cells 12 or the structural connections to cells 12).

Figure 35A:
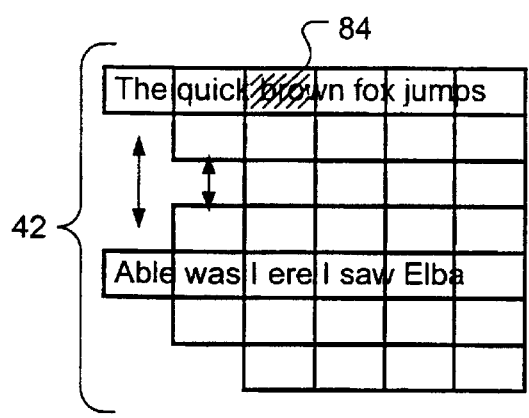
FIG. 35a–c depict the use of the invention for text outlining, showing all of the outline in FIG. 35a, an intermediate level in FIG. 35b, and a minimal level in FIG. 35c.
Figure 35B:
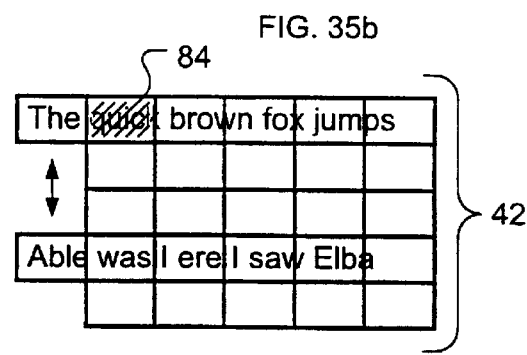
Figure 35C:
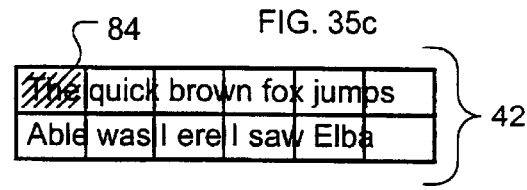

FIG. 35a–c shows the use of the invention for hierarchical text outlining, a function carried out by various commercial outlining programs (including many word processing programs). However, employing the hyperspace 10, the outline view is selectively revealed and hidden, not by more conventional user operations, but simply by moving the stepper 84 around in an I-raster 102 type view of the tissue 78 of textual data. FIG. 35a shows how the structural tissue 78 in this example holds text in a hierarchical arrangement, where it is fully revealed by the position of the stepper 84 on the top row, third cell. In FIG. 35b the stepper 84 has been moved to the left one cell, which has collapsed the view to four rows 42. In FIG. 35c, moving the stepper 84 to the far left further collapses the outline, to only two rows 42.

It should be noted that for this presentational function to work, a display mode is desirable whereby the text contents of a cell are shown across several cells to the right. Thus text "The quick brown fox jumps over the lazy dog," stored in the top and leftmost cell, is nevertheless shown spilling across several cells to the right. The mechanics of manipulating an outline in this manner also require particular special functions. The usual outliner function of vertical rearrangement is handled by jump (or "hop" ) operations, and requires no further implementation. Similarly, the usual outliner sideways movements ("promotion"and "demotion" of items) may be done with the slide (or "shear") operation. However, in order to fold rows together while marking them for rearrangement, promotion or demotion, a special marking-operation which proceeds downward and rightward across the on-screen tissue is beneficial. (The inventor terms this "Oklahoma Markdown," since it marks a subtissue cells shaped somewhat like the state of Oklahoma.) The mapping of outlining applications to these few functions shows a parsimony of design which is also beneficial.

FIG. 36a shows a schedule as a PERT chart 126 (Program Evaluation and Review Technique), and FIG. 36b shows the same schedule as a Planalog chart 128 (a system introduced by Stanley Mendell around 1964). This may be adopted by the inventive hyperspace 10. The PERT chart 126 shows the conditional dependencies of a schedule for a series of tasks. Here a task 132a must be completed before both task 132b and task 132e can be performed, task 132b must also be completed before task 132c can be performed, and both task 132c and task 132d must be completed before task 132e can be performed. This form of chart is difficult to present and manipulate, requiring complex computer programs, and was simplified in Mendell's invention to the concrete physical manifestation of a system of plastic markers sliding in a grooved block.

The relation of necessary precedence, shown by precedence arrows 134 in FIG. 36a, is present in Mendell's system by the analogous relation of pushing blocks in grooves. Here blocks may be substituted for the tasks of FIG. 36a. A block 136a pushes a block 136b and through the use of a comb 138 (or "divider") also pushes block 136d. This also causes block 136b to push block 136c, which through a second comb 138 then also pushes block 136e. In Mendell's implementation as schematically shown in FIG. 36b, the height of a block could be the length of a task, and so by pushing the blocks as close as they will go, it is possible to ascertain simply the minimum time in which the entire chain of tasks can be performed. (This assumes that the combs 138 have no thickness, which is not the case in FIG. 36b.) Another comb 138, representing the present instant, may be moved through the set of blocks 136, showing which tasks have been completed and which have not.

FIG. 36c illustrates an extension of the FIG. 36a–b PERT/Planalog models into a programming method employing the inventive hyperspace 10, expressing the PERT/Planalog model as a row and column visualization. This is accomplished by the transfer of Mendell's physical model to a representation of the blocks as cells, with vinks 76 in place of the combs 138 A trigger vink 142 provides a "now-line" for the current instant and triggering operations. The cells have the same sequential dependencies as the blocks. However, they also represent parts of the schedule which can be carried out automatically under the conditions specified—e.g., step A (task 132a /block 136a) has no prerequisites, and step E (task 132e/block 136e) can be carried out automatically if steps C and D are completed. When the trigger vink 142 reaches cell 12a, which has no prerequisites, it triggers cell 12a. When the trigger vink 142 reaches cell 12e, it senses, through the information in the cell, that prerequisites C and D (represented as cell 12c and cell 12d) are "above" it, i.e., negward in the dimension shown vertically. This indicates to the program that C and D are in the past, and thus that the prerequisites for automatic cell 12e have been satisfied, so that it is triggered. In this method, when the user completes a human task, he or she jumps the cell representing the task over the now-line (trigger vink 142), to show that the task is in the past.

This method can particularly be generalized as an inside-out method for programming computers in interactive systems. Tasks designated for the user, when completed, are hopped across the now-line, and tasks which can be performed automatically are triggered. This is the opposite of much conventional programming, which represents an interactive system as a series of automatic events which stop and wait for a user. In this inside-out representation, the inventive hyperspace 10 is represented as a human schedule which just happens to have parts that can be carried out automatically. The two representations are equivalent, but this one is human-centric rather than machine-centric.

The rectangular constraints of spreadsheets can be undesirable, and mimicking their function a mistake. The inventive hyperspace 10 permits an alternative to this as a free-form world, where identical function can be easily achieved, and directed to operate on a specific spatial pattern of cells (either adjacent, or anywhere). For instance, a cell can be created which adds or multiplies all of the cells which are negward from it in a specific dimension; or, for that matter, carrying out any function on the data in connected cells. This can look like an arithmetic operator or an arithmetic vink. In defining such functions, the syntax of the operands can be listlike, Polish, Hungarian, or even APL, but implemented through the condition of being able to operate on a specific spatial pattern of cells. For an example, an arithmetic cell which operates on all of the cells in a rank can lie in wait, checking after every user input whether a cell has been modified in that rank, then recalculating if so.

FIG. 37a–b illustrate how certain database operations can be achieved with the hyperspace 10 simply by moving the stepper 84, rather than by explicit user commands. The vertical dimensions 16 here represent a collection of name-and-address records 144. The horizontal dimensions 16 show the different fields in each record 144. The presentational sequence, or raster, here is the I-raster, presenting successive rows 42 emanating from the current column of the stepper 84.

In FIG. 37a, the stepper 84 is on the last name "Harris," and the vertical dimension 16 in that rank 32 shows connected cells 12 of other last names in alphabetical order. The addresses and first names associated with the last names are appropriately shown, since they emanate sideways as rows 42 from the current column 96, defined by the location of the stepper 84.

In FIG. 37b, the user has moved the stepper 84 sideways to Harris' first name, "Charles." In the current row 94, the entry for Charles Harris, is unchanged. But the view has shifted to show the alphabetically sequenced first names above and below the name "Charles." Consequently the sequence of rows 42 above and below the current row 94 is not the same as they were in FIG. 20a, now instead being derived from the alphabetical sequence of first names. The addresses and last names associated with each first name are appropriately shown, since they emanate sideways as rows 42 from the current column 96.

In FIG. 37a–b the sequence of rows 42 derives from the sequence of the current column 96, holding the stepper 84. The dimensions 16 of view have not changed and the viewing raster has not changed, but moving the stepper 84 one cell 12 leftward has greatly changed the view.

Figure 38:
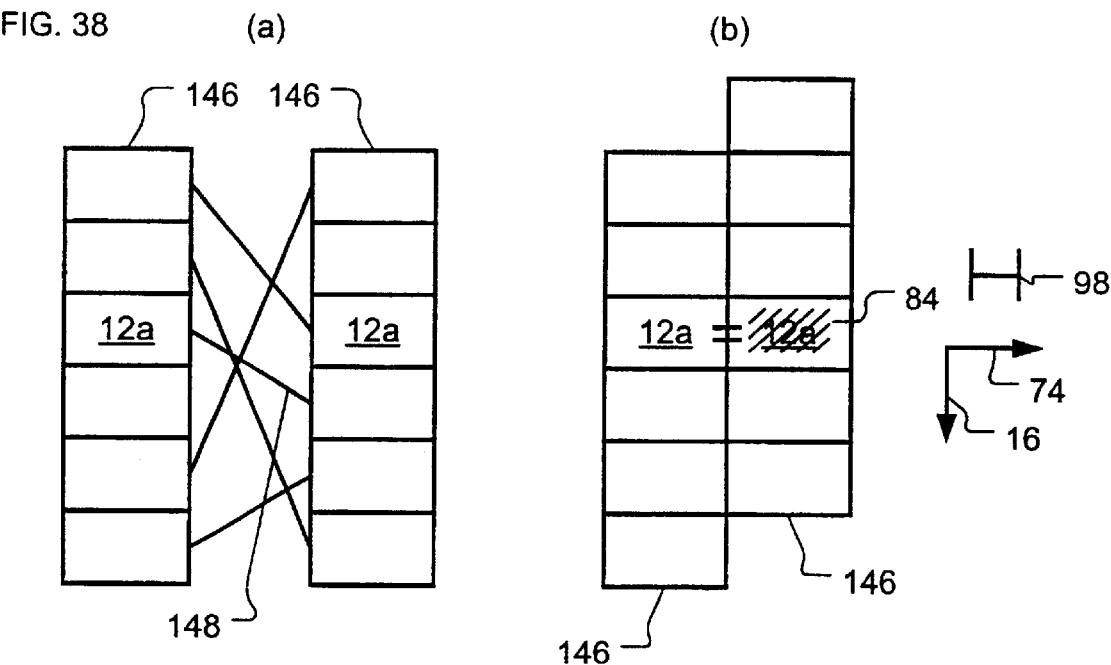
FIG. 38a–b, respectively, show the use of the invention's display of two alternate orderings of the same contents of lists at the same time.

FIG. 38a–b show the use of the inventive hyperspace 10 for seeing two separate orderings of the same contents at the same time. FIG. 38a (taken from an illustration in the inventor's article, "A File Structure for the Complex, the Changing, and the Indeterminate," Proceedings of the Association for Computing Machinery 1965 annual conference) shows a screen visualization of two separate lists 146, each of which contains some of the same elements in a different order. For instance, the line 148 between the two cells 12a here shows that they are the same element, as do the other three lines between the two columns for other elements.

FIG. 38b shows the same information presented using the hyperspace 10 and an H-raster 98. The equal sign ("=") between the cells 12a again shows the user that the two cells are identical. The horizontal dimension is the clone dimension 74 and the vertical dimension 16 is the ordering of the lists 146.

This improved form of presentation can be used for a wide variety of functions, including checkbook reconciliation, version management (comparing side by side the order of parts of different versions), and general list management.

Figure 39:
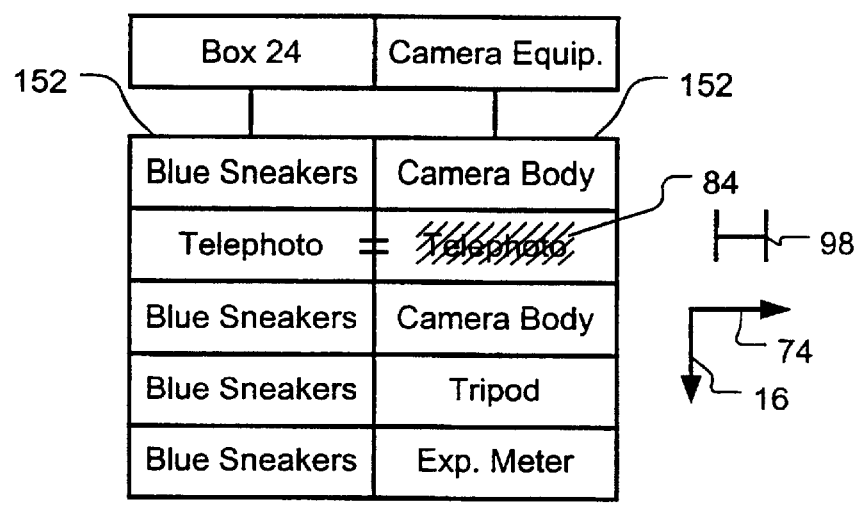
FIG. 39 schematically depicts the invention coordinating a possession list with a storage list.

FIG. 39 shows application of the hyperspace 10 for coordinating a list of possessions with a storage list. As shown here, the user has a master list 152 of camera equipment which he or she owns, and separate lists of contents of storage units (such as boxes and drawers). An item in the master list 152 of camera equipment is also cloned to a particular storage list 154 for the unit in which it is stored. Thus by placing a stepper 84 on that item's name in the master list 152 of camera equipment, the user may see in what box it is to be found. This uses the H-raster 98.

Figure 40:
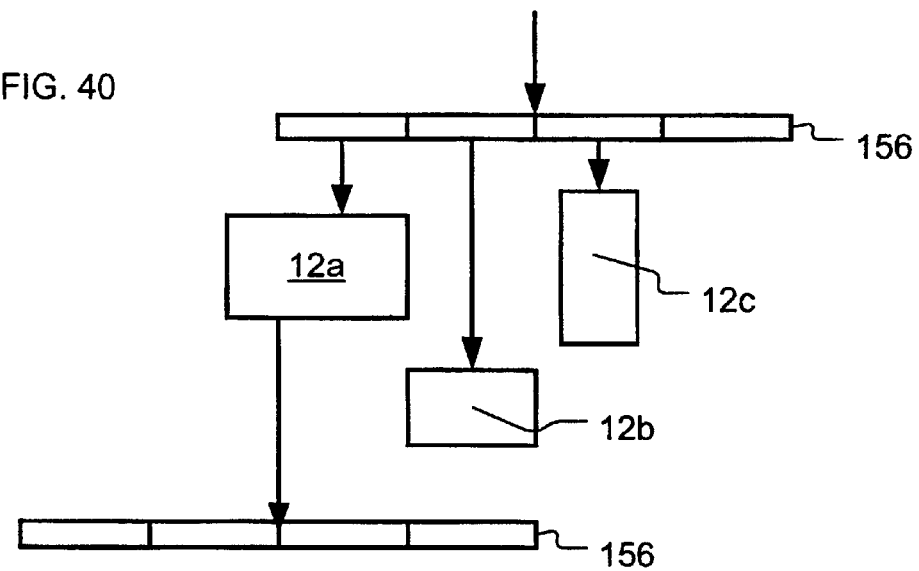
FIG. 40 schematically depicts the invention used as a multimedia authoring and user system.
Figure 43:
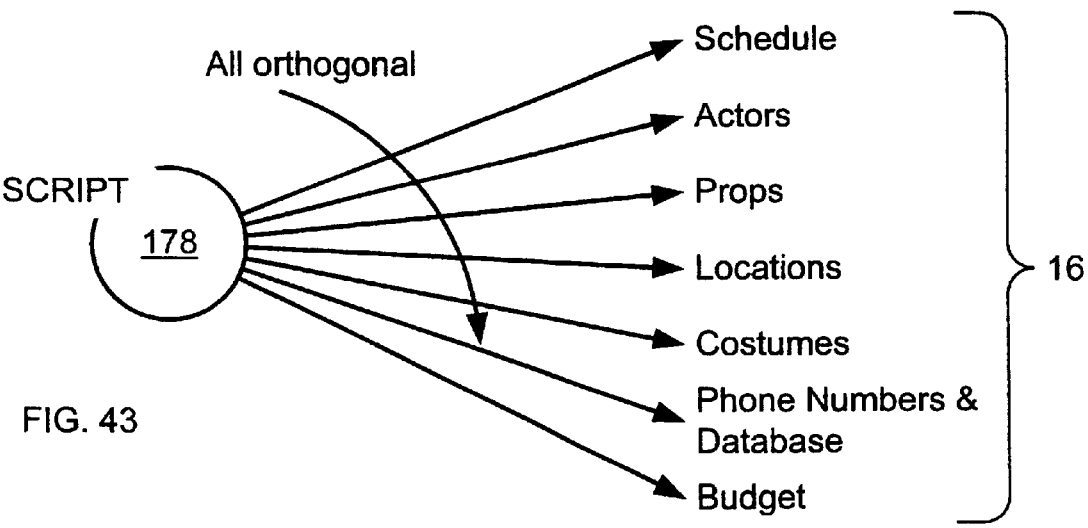
FIG. 43 schematically depicts the invention used to create a rotatable tissue representing all phases of a movie production project.

FIG. 40 shows the hyperspace 10 used as a multimedia authoring and user system, where a choice vink 156 represents the different branches to be taken at a given point, depending on user input. The user input, matched to a cell on the choice vink 156, activates the corresponding presentation. For example, a cell 12a may here contain a video presentation, a cell 12b may contain audio, and a cell 12c may contain text. Further, once the video presentation is complete, it may even initiate another choice vink 156.

Figure 41:
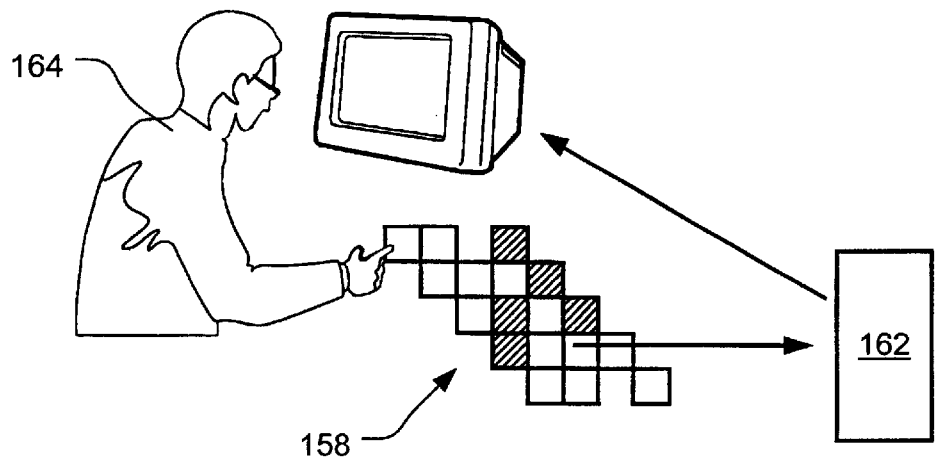
FIG. 41 schematically depicts the use of the invention to create a customized menu for another party's computer application.

FIG. 41 represents the use of the hyperspace 10 to create a customized menu 158 for some other application 162 on a computer, such as WORD TM or EXCEL TM. The user 164 employs the customized menu 158 to generate virtual keystrokes, or scripting triggers in such a language as Applescript, OLE or Activex. These keystrokes are then passed to the other application 162, and generate the desired effect. By this means users may bypass interfaces they don't like and create their own.

Figure 42:
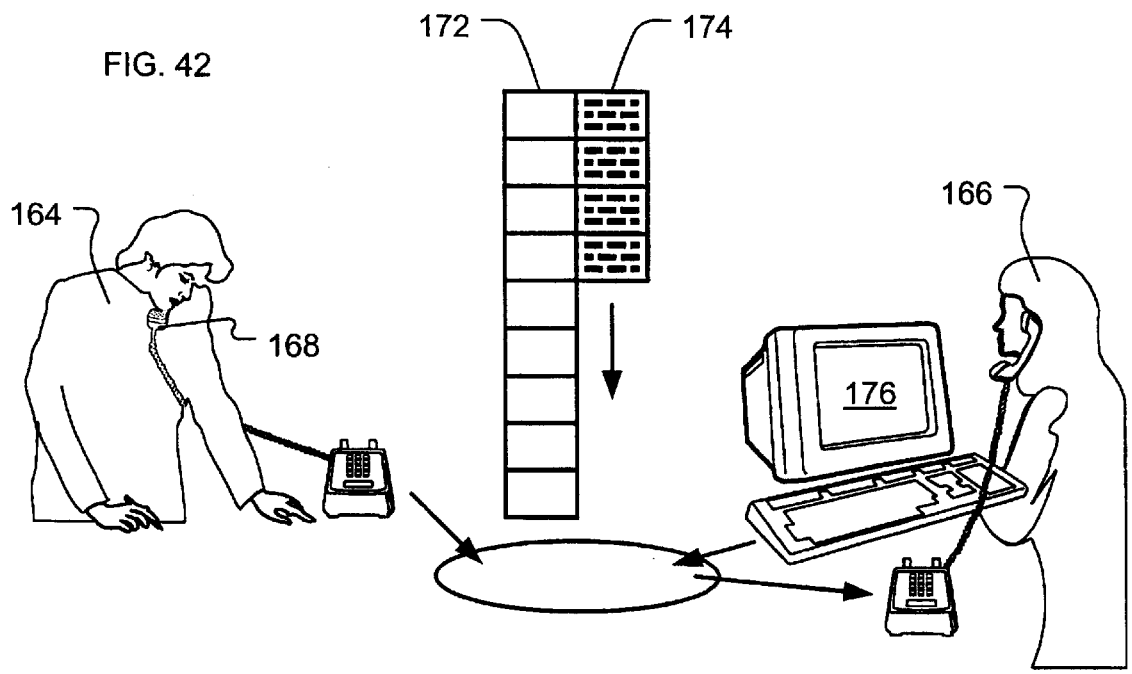
FIG. 42 schematically depicts the invention used for dictation and transcription.

FIG. 42 shows schematically the use of the hyperspace 10 for dictation and transcription The user 164 dictates into a touch-tone telephone 168, controlling the dictation system by use of the buttons on the telephone 168, to represent the beginning and ends of audio units with particular touch-tone codes. The audio units are recorded and stored digitally in audio cells 172. A transcriber 166 listens to the audio cells 172 and transcribes them into corresponding text cells 174, using a text entry device 176 to record ASCII or other textual codes. As this operation proceeds the new text cells 174 are mapped to the audio cells 172 from which they originate, by linking them in the hyperspace 10, and the audio cells 172 are not immediately discarded. The user 164, using this segmented and matched arrangement of text cells 174 and the original audio cells 172, now is much better able to proofread and correct the transcription than by conventional methods.

FIG. 43 through FIG. 49 represent schematically the use of the hyperspace 10 to create a rotatable structure tissue 78 of cells 12 representing all phases of a movie production project. The central plan, at a hub 178 (in this case a movie script) is connected on separate dimensions 16 to cells 12 noting various other aspects of the project: the schedule, actor list, property list, locations, plans, costumes, phone numbers and database, and the budget. The rotation of this tissue 78 then shows many of these relations without the user needing to learn further commands.

Figures 44, 45:
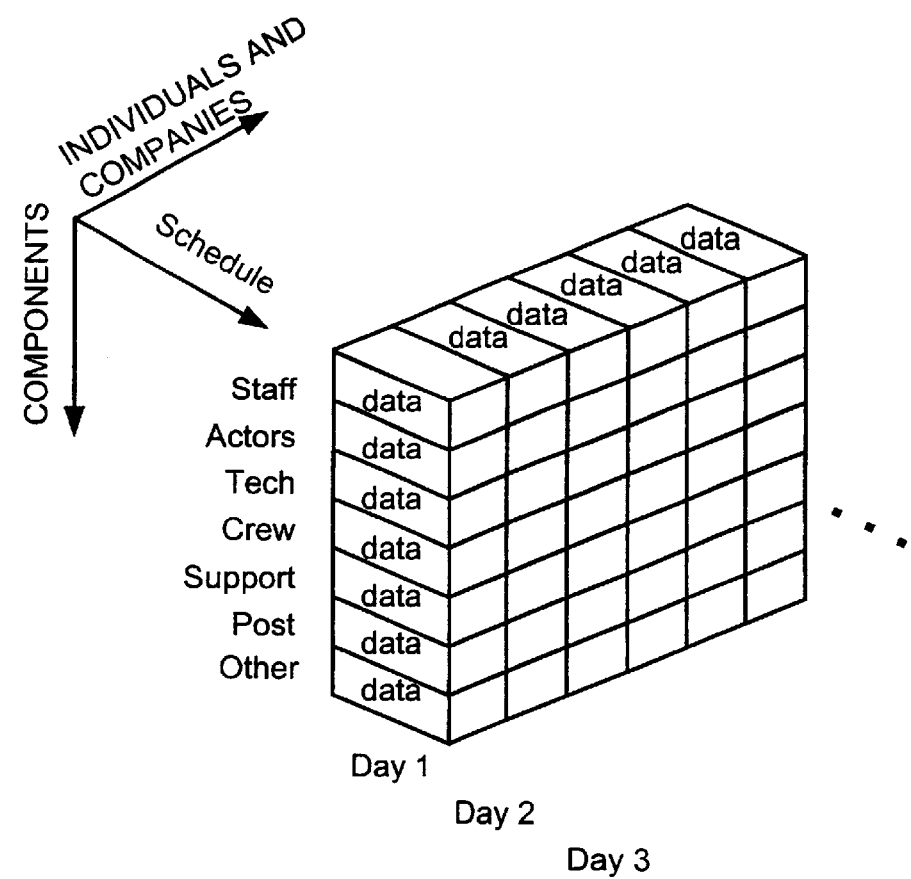
FIG. 44 depicts one view of the rotatable tissue of FIG. 43, listing various individuals in separate ranks.
FIG. 45 depicts how the scheduling dimension can array the many participants in the tissue of FIG. 43 at right angles to time.
Figures 46, 47:
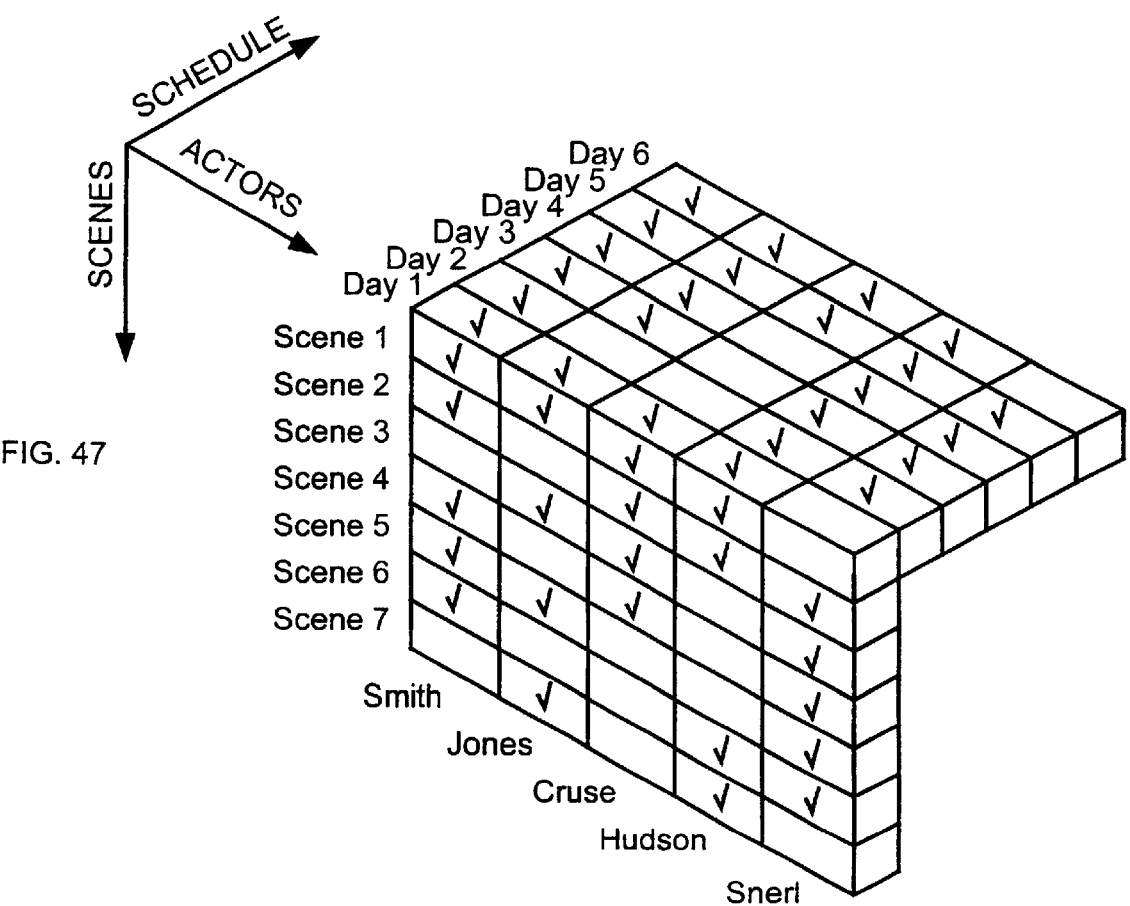
FIG. 46 depicts how the current schedule and particular scenes of the movie tissue of FIG. 43 interrelate.
FIG. 47 depicts the necessary presence of particular actors for particular scenes and particular shooting days, for the movie tissue of FIG. 43.
Figure 48:
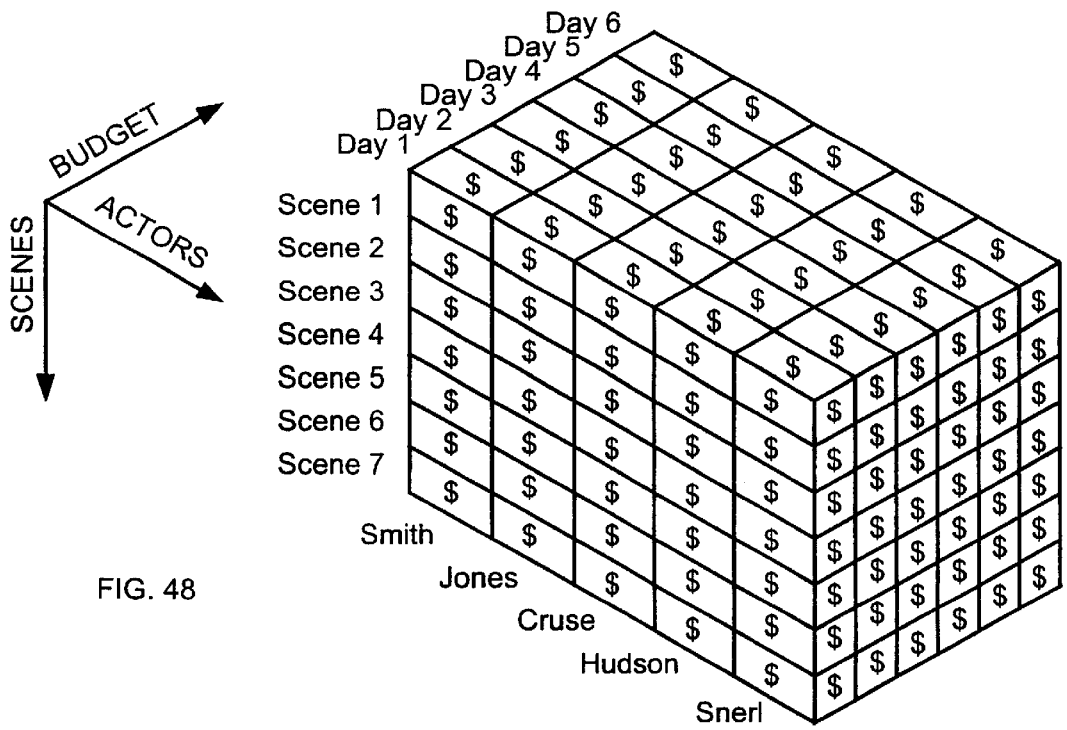
FIG. 48 depicts a three-dimensional view clarifying the relation between actors, scenes and budget for the movie tissue of FIG. 43.
Figure 49:
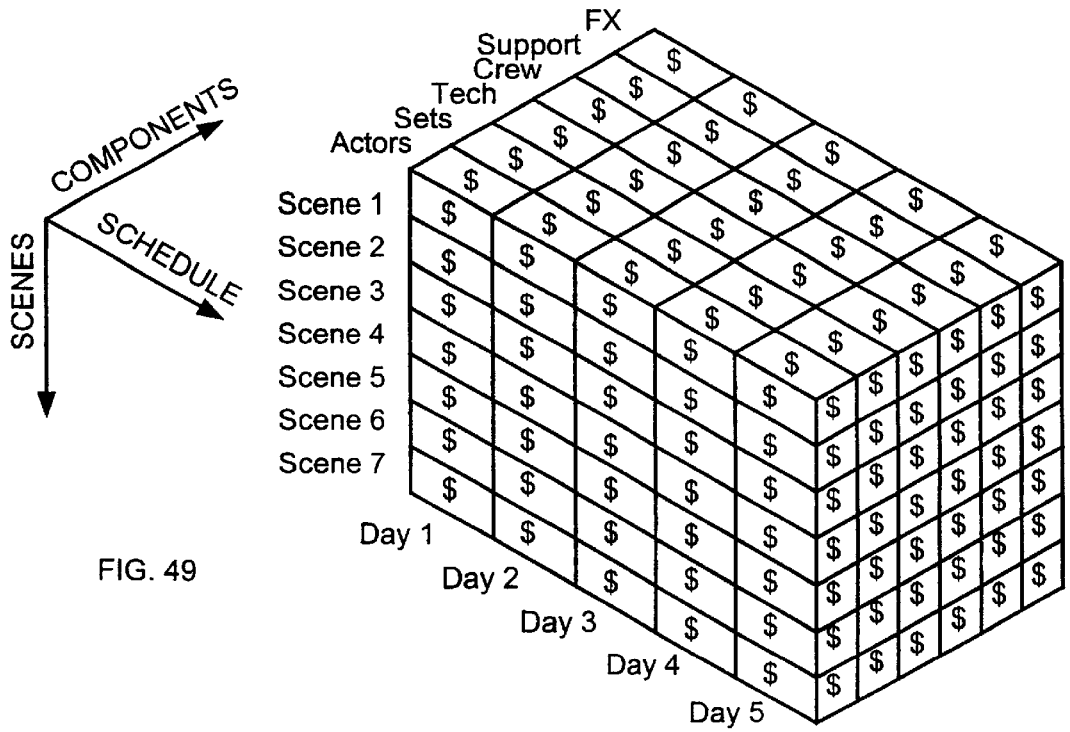
FIG. 49 depicts a three-dimensional view of this data tissue in which each scene and each day are broken into their separate component budget items.

FIG. 44 shows one view of the rotatable database tissue 78 of the hypothetical movie project, with the listing of various individuals in separate ranks 32. FIG. 45 then shows how the scheduling dimension 16a can array the many participants at right angles to time. FIG. 46 shows a rotation of the tissue 78 showing how the current schedule and the particular scenes of the movie interrelate. The vertical dimension 16 shows the ordering of the scenes and the horizontal dimension 16 shows the calendar, i.e., the actual shooting schedule. FIG. 47 shows the necessary presence of particular actors in both particular scenes and on particular shooting days. (In a three-dimensional array this might be transparent except for the check-marks.) This helps optimize the plan, to adjust the shooting schedule so that (for instance) the most expensive per-diem actors need come on the fewest days. FIG. 48 shows a three-dimensional view clarifying the relation between actors, scenes and budget. Each dollar-sign would be replaced by the actual money to be paid to that actor on that day. This would be transparent except for the dollar amounts. (Sums could be displayed at either end of each strip 56.) And FIG. 49 shows a three-dimensional view of this data tissue 78 in which each scene and each day are broken into their separate component budget items.

As implied in the preceding example, time can be a dimension (for ordinal cell sequence) or a measure (for linear cell sequence). By its participating in a time dimension (either ordinal or continuous), such temporal parameters as the time of cell creation, a time of versioning, a project's due date, a time of data input, etc. can easily be associated with a cell.

Figure 50:
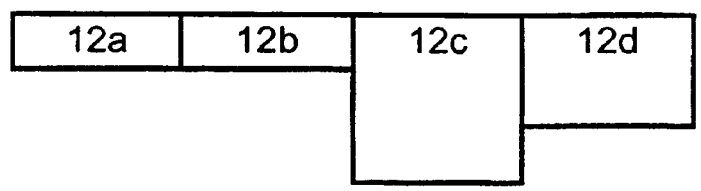
FIG. 50 schematically depicts the use of the invention to store e-mail by breaking separate sections into separate linked cells.
Figure 51:
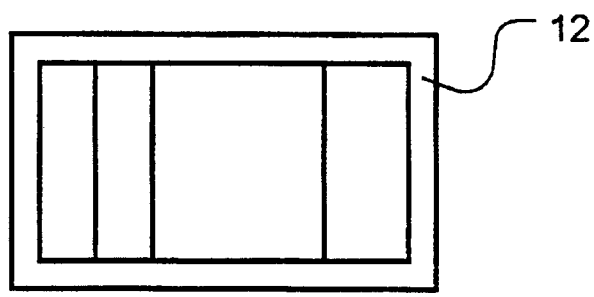
FIG. 51 schematically depicts encapsulation of the separate e-mail parts of FIG. 50 into a single overall cell.
Figure 52:
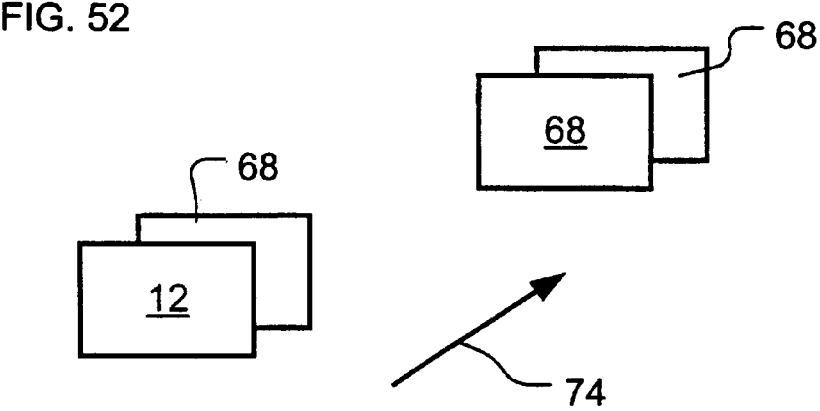
FIG. 52 schematically depicts how the invention may be used for cross-filing of e-mail contents.

FIG. 50 shows schematically the use of the invention to store e-mail in a particularly accessible format, by breaking its separate sections into separate linked cells, where cell 12a can be the "from" part of the e-mail header, cell 12b the "to" part, cell 12c the contents of the e-mail, and cell 12d an attachment to the e-mail. FIG. 51 shows that encapsulation of the separate e-mail parts can be made into a single overall cell 12. FIG. 52 shows the use of the hyperspace 10 for cross-filing of contents (in this case e-mail again, allowing messages to be stored simultaneously in many different places) as cloned instances (clone cells 68) of the e-mail's encapsulating a cell 12 in different locations.

Returning to FIG. 29, this illustrates a journal implemented using the inventive hyperspace 10. Here the tissue 78 is a "gameboard" in which the stepper 84 first appears at the homecell 108. By moving left the stepper 84 goes to various operational menus 116, shown here only by the label on the endcells 34 and not showing the submenus below. Below the homecell 108 are endcells 34a for ranks connected to: a schedule; a list of objectives for the month; a list of objectives for the week; a list of objectives and appointments for the day; and a large cell entitled "vital and urgent." To the right of the homecell 108 is a column rank with the endcell 34b labeled "journal." Each new entry anywhere here also appears cloned to the journal list. To the right of endcell 34b is a series of columns representing the author's world of current projects in 1994, abbreviated to their endcell 34c labels "ZZ," "PGF," "N.M.," "XU," "Xu Client," and "BSPM." Below each of these project endcells 34c are topic cells, each representing the endcell of a horizontal rank. By stepping to a project column, then stepping down to one of these topic cells, the user at once sees a row of items within that topic, each of which can in turn be the endcell of a rank.

Turning now to some general comments, today's computer windowing operating systems are highly conventionalized, stereotyped and arbitrary. Users of such systems must continually move their hands from keyboard to mouse and back again. This means there is a strong case for all-keyboard operation of the hyperspace 10, though operation by mouse and other hand-pointer is of course perfectly valid. Furthermore, multi-cursor operation, which is defined for the hyperspace 10, argues for multiple windows. The hyperspace 10 permits unconventional approaches to windowing. For instance, by defining arrow keys for each user hand, and having each hand control a separate stepper at the same time. Note that in multiple stepper operations, the user may sometimes experience seeing more than one stepper in a window, and sometimes not. An obvious and possibly beneficial two stepper method of operation is to put a menu under one hand and a selection of operands under the other, perhaps allowing selections and manipulations at typing speed.

One particular operating system-like capability which the inventive hyperspace 10 particularly may be useful for is visualization and control of parallel processes in multiple computer systems.

An alternative method of operation of the hyperspace 10 may be "windowless," showing a local clump of cells surrounding each stepper, and letting each stepper wander around a screen carrying a selection of the cells of its current location. As steppers wander in this manner their local areas of operation can separate and recoalesce. However, this could be disconcerting in some case, since much depends on the algorithms used for showing this.

Computer applications today require considerable flexibility, in large part due to the expectations of their users. In the hyperspace 10, the cells may contain and play animations or pieces of audio when executed. Or the cells can represent individual animation frames, or sub-sequences of frames, or even 2.5D animation layers. As a particularly simple way of brightening the use of the invention, particular cells and types of cells may have entrance and exit animations and sounds. This makes them distinctive and requires no conditional examination of what other cell the user is coming from (in the case of an entrance performance) or going to (in the case of an exit performance).

Individual cells can represent data points, and in a suitable viewing mode, plot themselves. For instance, a zone of cells can each have an X and Y measure, and appear as a point in a scattergram of points. Even better, a cell can have a number of measures, to be selected by the user, allowing the points to appear in one arrangement and then morph to another, as each cell is moved incrementally from (say) its X×Y position to its Q×W position. This can be combined with a line-drawing program. Each line endpoint could have several data measures, allowing it to be plotted in a number of positions; and on command, to morph from (say) its X×Y position to its Q×W position. Thus we could see a diagram graciously flex and reposition itself.

The inventive hyperspace 10 also has application in programming directly. The problem of programming language design is really the representation of things to be done for human comprehension and review; and so it is not technical adequacy or enactability which limits us, but human visualization or mental comprehension that is instead the center of programming language design. New visualizations have always stimulated programming language research and development, and this invention seems likely to do the same.

Since cells in this invention can be made executable, and can in turn contain executable cells, and can be cloned or instanced in different places, the invention manifestly provides a way to write simple programs ("scripts") spatially. The great success of spatial visualization in the spreadsheet world, and the hunger of users for easy scripting languages, makes this a promising avenue. In this structure one can represent any programming constructs geometrically (cf. Nassi-Schneiderman diagrams, Booch diagrams). An execution stepper travelling downward for simple operations, an execution vink travelling downward for parallel operations, outlining for nested operations, etc., are all obvious steps.

Another area of concern in the programming realm is the problem of commenting and proving meta-information in association with files. The whole development of file formats (and their tangled packing of discrete elements and meta-information) is based on the triviality of file systems. Since there is no way of associating meta-information with files (except for name, creation date and suffix), all the additional information has to be packed somehow into the file, as headers, tags, etc. This is unfortunate.

The present invention may provide interesting benefits in this area. Since a filename can be associated with a cell, this system provides an environment for associating discrete information items with files, and even encapsulating in other cells as wrappers. In other words, this might provide a robust facility for moving meta-information out of the file into some stable association from outside, where it should have been all along. Externally commenting files, and noting associated discrete elements outside the file, could be generally very useful, This in turn leads to another possibility. This invention can be made an optional extension inside a mountable file system, making its discrete multidimensional associative facility commonly available to users and programmers for all purposes. This in turn could be very liberating at both the personal and system level.

The inventive hyperspace 10 may also provide benefits for forms of equipment besides current conventional computer systems. Touch-tone phones and other numerical and arrow pad devices are capable of running some variants of the invention. In particular, the hyperspace 10 can provide a principled basis for some of today's more complicated accessories. Embedding the invention into equipment, like video cameras, video cassette recorders (VCR's), or microwave ovens, can lead to a liberating simplification of the present interfaces for such equipment. If reconfigurability of the interface is possible in conjunction with the orderly structure provided by the present invention, this provides a great improvement over the present complexity of such equipment.

Still other equipment which may particularly benefit from the more principled form of interface of the hyperspace 10 include the class of memo gadget presently called a "PDA" and the emerging class of wearable computers.

In addition to the above mentioned examples, various other modifications and alterations of the inventive hyperspace 10 may be made without departing from the invention. Accordingly, the above disclosure is not to be considered as limiting and the appended claims are to be interpreted as encompassing the true spirit and the entire scope of the invention.

INDUSTRIAL APPLICABILITY

The present hyperspace 10 is well suited for application in computer systems and in microprocessor controlled appliances. Personal computers, mainframe terminals, personal digital assistants, and the emerging field of wearable computers all may benefit by use of the invention. Similarly, very common appliances like video cassette recorders and microwave ovens, and still un thought of other devices may also benefit.

A great obstacle to how complex systems and what the can accomplish has become the ability of the users to visualize and manipulate the data which such systems handle. The hyperspace 10 is a means to directly improve such visualization and manipulation capability. This makes the potential list of users of the invention very large, encompassing many industries and interests.

The hyperspace 10 imposes very little burden to provide its benefits. It can be implemented in any of many widely used and understood programming languages, to run under most conceivable operating systems. The inventor has recently produced a demonstration version using PERL ™ scrip and running under the LINUX™ operating system. Present visual languages, such as Basic and C++, are strong candidates for other implementations to run under the WINDOWS™ and MACINTOSH™ operating systems.

The hardware requirements for the invention are also little burden to provide. The inventor's demonstration version is transportable on a single 1.4 megabyte diskette, and runs easily on what are today low-end x86 systems. Since some single-chip microprocessor systems already have more memory than this and are more powerful, only the requirement of a suitable display is of any importance. Since the invention is largely perceived visually, the display used is of importance. But widely and cheaply liquid crystal and dot-matrix units are adequate for many embodiments. And conventional computer CRT monitors be adequate for even very powerful embodiments of the inventive hyperspace 10.

For the above, and other, reasons, it is expected that the hyperspace 10 of the present invention will have widespread industrial applicability. Therefore, it is expected that the commercial utility of the present invention will be extensive and long lasting.

What is claimed is:

1. A method for visualizing data on a display, comprising:

placing the data in cells, wherein each cell has at least one matched pair of connectors consisting of a negative connector and a positive connector defining a dimension in which said cells may connect with said negative connectors to said positive connectors;

connecting said cells into a tissue having a plurality of said dimensions which are all orthogonal;

displaying at least one view of said tissue on the display, wherein each said view includes a portion of said tissue in at least two of said dimensions;

designating one said cell as a current cell, wherein said current cell is the center of presentation within each said view;

controllably changing which said cells appear in said views by selectively picking another said cell to be said current cell, thereby moving the center of presentation within said views and changing said portion of said tissue appearing in said views; and controllably navigating which said dimensions appear in a particular said view by selectively picking another said dimension defined for said current cell, thereby also changing said portion of said tissue appearing in a said view.

2. The method of claim 1, further comprising:

identifying said current cell within each said view with a stepper; and presenting said cells in each said view using a raster order defining a sequence of presentation originating from said current cell.

3. The method of claim 2, further comprising attaching said steppers in all said view in a stepper dimension.

4. The method of claim 2, wherein each said view has defined a horizontal axis and a vertical axis, the method further comprising:

said step of presenting uses a raster order including a horizontal strip consisting of said current cell and a contiguous subset of said cells which are connected to said current cell in a first said dimension which is mapped to said horizontal axis of said view;

said raster order further including vertical strips each consisting of one said cell present in said horizontal strip and a contiguous subset of said cells which are connected to said one said cell in one said dimension, wherein said one said dimension is a second dimension which is mapped to said vertical axis of said view, thereby presenting said Rasa order in an H-shape.

5. The method of claim 2, wherein each said view has defined a horizontal axis and a vertical axis, the method further comprising:

said step of presenting uses a raster order including a vertical strip consisting of said current cell and a contiguous subset of said cells which are connected to said current cell in a first said dimension which is mapped to said vertical axis of said view;

said raster order further including horizontal strips each consisting of one said cell present in said vertical strip and a contiguous subset of said cells which are connected to said one said cell in one said dimension, wherein said one said dimension is a second dimension which is mapped to a horizontal axis of said view, thereby presenting said Rasa order in an I-shape.

6. The method of claim 2, further comprising:

chousing one said view as a current view; and moving said stepper from said current cell to a contiguous said cell appearing in current view, as part of said step of controllably changing which said cells appear in said views.

7. The method of claim 1, wherein said step of displaying includes controlling the appearance of respective said cells in said views based upon attributes for the data contained in said cells.

8. The method of claim 1, wherein said step of displaying includes controlling the appearance of a particular said cell in said views based upon an instruction included in the data contained in said particular said cell.

9. The method of claim 1, further comprising performing editing on the data contained in said cells.

10. The method of claim 1, further comprising performing operations on a said cell from the set of operations consisting of deleting said cell, adding a said matched pair of connectors to said cell, connecting said cell, and disconnecting said cell.

11. The method of claim 1, further comprising cloning a particular said cell to a clone cell, wherein said clone cell is a copy of the data in said particular said cell.

12. The method of claim 11, further comprising attaching said particular said cell and all said clone cells depending therefrom in a clone dimension.

13. The method of claim 1, further comprising cloning a particular said cell to a clone cell, wherein said clone cell is a reference back to said particular said cell, thereby cloning by transclusion.

14. The method of claim 13, further comprising attaching said particular said cell and all said clone cells depending therefrom in a clone dimension.

15. The method of claim 1, further comprising performing operations in a computer system if particular said cells appear in a said view.

16. The method of claim 1, further comprising performing operations in a computer system whenever a particular said cell is said current cell.

17. The method of claim 1, wherein the data placed in said cells includes at least one instance of members of the set consisting of text, audio, video, and microprocessor instructions.

* * * * *